(12) United States Patent
Nagai

(10) Patent No.: US 10,063,725 B2
(45) Date of Patent: Aug. 28, 2018

(54) INFORMATION PROCESSING APPARATUS, INFORMATION PROCESSING METHOD, AND INFORMATION PROCESSING SYSTEM

(71) Applicant: Kohta Nagai, Kanagawa (JP)

(72) Inventor: Kohta Nagai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/832,912

(22) Filed: Dec. 6, 2017

(65) Prior Publication Data

US 2018/0097951 A1   Apr. 5, 2018

Related U.S. Application Data

(63) Continuation of application No. PCT/JP2016/067872, filed on Jun. 16, 2016.

(30) Foreign Application Priority Data

Jul. 6, 2015  (JP) .................................. 2015-134962

(51) Int. Cl.
*H04N 1/00* (2006.01)
*G06F 13/12* (2006.01)

(52) U.S. Cl.
CPC ....... *H04N 1/00509* (2013.01); *G06F 13/122* (2013.01); *H04N 1/0097* (2013.01);
(Continued)

(58) Field of Classification Search
CPC ........... H04N 1/00509; H04N 1/00474; H04N 1/00973; H04N 1/00498; H04N 1/0097; H04N 2201/0094; G06F 13/122
(Continued)

(56) References Cited

U.S. PATENT DOCUMENTS 7,032,186 B1 *   4/2006   Gasser ................. G06F 3/0481
                                                     707/999.102
2003/0084401 A1   5/2003   Abel et al.
(Continued)

FOREIGN PATENT DOCUMENTS

JP       2003-186733        7/2003
JP       2006-023853        1/2006
(Continued)

OTHER PUBLICATIONS

International Search Report dated Aug. 2, 2016 in PCT/JP2016/067872 filed on Jun. 16, 2016.
(Continued)

*Primary Examiner* — Allen H Nguyen
(74) *Attorney, Agent, or Firm* — IPUSA, PLLC

(57) ABSTRACT

An information processing apparatus for providing, via a network, information indicating a resource to be displayed on a screen of a client device includes a resource manager to store resources, wherein each resource belongs to one of resource groups, each of the resource groups belongs to a content item, display priority orders are respectively assigned to two or more of the resource groups when the two or more of the resource groups belong to the content item, and identification information is attached to the content item; a receiver to receive, from the client device, the identification information of the content item; a selector to select, based on the identification information of the content item and the priority orders for displaying, a resource to be displayed on the screen of the client device from the resources; and a transmitter configured to transmit information indicating the resource to the client device.

7 Claims, 28 Drawing Sheets

(52) U.S. Cl.
CPC ..... *H04N 1/00474* (2013.01); *H04N 1/00498* (2013.01); *H04N 1/00973* (2013.01); *H04N 2201/0094* (2013.01)

(58) Field of Classification Search
USPC ........................................................ 358/1.13
See application file for complete search history.

(56) References Cited

U.S. PATENT DOCUMENTS

| | | |
|---|---|---|
| 2004/0267762 A1 | 12/2004 | Tunning et al. |
| 2006/0227343 A1 | 10/2006 | Yamaguchi |
| 2008/0201510 A1* | 8/2008 | Shirai ................ H04N 1/00204 710/106 |
| 2012/0150912 A1* | 6/2012 | Ripberger ............... G06F 21/80 707/786 |
| 2012/0278426 A1* | 11/2012 | Nakagawa ............ G06F 3/0604 709/217 |
| 2014/0244236 A1 | 8/2014 | Johnson, III et al. |
| 2015/0106400 A1 | 4/2015 | Farrelly et al. |

FOREIGN PATENT DOCUMENTS

| | | |
|---|---|---|
| JP | 2008-171085 | 7/2008 |
| JP | 2008-262306 | 10/2008 |
| JP | 2010-129057 | 6/2010 |

OTHER PUBLICATIONS

Extended European Search Report for 16821201.7 dated May 16, 2018.

* cited by examiner

FIG.5
Application Market
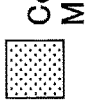
Feel free to use!
 ID Card Copy
ID cards can be copied on a sheet of paper.
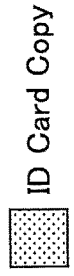 Conference Material Copy
Ensures appropriate use of copy for conference.

FIG.10

| RESOURCE ID | RESOURCE NAME | RESOURCE VALUE |
|---|---|---|
| 1 | IMG_TITLE | http://applicationmarket.com/images/title.jpg |
| 2 | WORD_TITLE_JP | APPLICATION MARKET |
| 3 | WORD_TITLE_EN | Application Market |
| 4 | WORD_DESC_JP | LET'S USE IT FOR TRIAL |
| 5 | WORD_DESC_EN | Feel free to use! |
| 6 | STYLE_JP | http://applicationmarket.com/css/style_jp.css |
| 7 | STYLE_EN | http://applicationmarket.com/css/style_en.css |
|  |  |  |
| 8 | IMG_APP01 | http://applicationmarket.com/images/id_card_copy.jpg |
| 9 | LINK_INSTALL_APP01 | http://applicationmarket.com/install?appId=1 |
| 10 | WORD_APP01_TITLE_JP | ID CARD COPY |
| 11 | WORD_APP01_TITLE_EN | ID Card Copy |
| 12 | WORD_APP01_DESC_JP | A CARD SUCH AS A DRIVER'S LICENSE CAN BE EASILY COPIED ONTO A SINGLE SHEET OF PAPER |
| 13 | WORD_APP01_DESC_EN | ID cards can be copied on a sheet of paper. |
|  |  |  |
| 14 | LINK_INSTALL_APP02 | http://applicationmarket.com/install?appId=2 |
| 15 | IMG_APP02 | http://applicationmarket.com/images/meeting_material_copy.jpg |
| 16 | WORD_APP02_TITLE_JP | CONFERENCE MATERIAL COPY |
| 17 | WORD_APP02_TITLE_EN | Meeting Material Copy |
| 18 | WORD_APP02_TITLE_EN | Conference Material Copy |
| 19 | WORD_APP02_DESC_JP | COPYING CAN BE EASILY PERFORMED WITH A STYLE SUITABLE FOR MATERIALS DISTRIBUTED IN A CONFERENCE |
| 20 | WORD_APP02_DESC_EN | You can copy meeting materials with appropriate style settings. |
| 21 | WORD_APP02_DESC_EN | Ensures appropriate use of copy for conference. |
|  |  |  |
| 22 | LINK_INSTALL_APP03 | http://applicationmarket.com/install?appId=3 |
| 23 | IMG_APP03 | http://applicationmarket.com/images/easy_scan.jpg |
| 24 | WORD_APP03_TITLE_JP | SIMPLE SCAN |
| 25 | WORD_APP03_TITLE_EN | Easy Scan |
| 26 | WORD_APP03_DESC_JP | SCANNING FUNCTION CAN BE USED SIMPLY AND EASILY |
| 27 | WORD_APP03_DESC_EN | You can use scan function very easily. |
|  |  |  |
| 28 | LINK_INSTALL_APP04 | http://applicationmarket.com/install?appId=4 |
| 29 | IMG_APP04 | http://applicationmarket.com/images/ippatsu_scan.jpg |
| 30 | WORD_APP04_TITLE_JP | ONE SHOT SCAN |
| 31 | WORD_APP04_DESC_JP | SCANNING CAN BE MADE BY ONE SHOT |

FIG. 11

| RESOURCE GROUP ID | DESCRIPTION | RESOURCE ID | RESOURCE NAME | RESOURCE VALUE |
|---|---|---|---|---|
| RSG_BASIC_JP | COMMON RESOURCES (JAPANESE) | 1 | IMG_TITLE | http://applicationmarket.com/images/title.jpg |
| | | 2 | WORD_TITLE_JP | APPLICATION MARKET |
| | | 4 | WORD_DESC_JP | LET'S USE IT FOR TRIAL |
| | | 8 | IMG_APP01 | http://applicationmarket.com/images/id_card_copy.jpg |
| | | 9 | LINK_INSTALL_APP01 | http://applicationmarket.com/install?appId=1 |
| | | 10 | WORD_APP01_TITLE_JP | ID CARD COPY |
| | | 12 | WORD_APP01_DESC_JP | A CARD SUCH AS A DRIVER'S LICENSE CAN BE EASILY COPIED ONTO A SINGLE SHEET OF PAPER |
| | | 14 | LINK_INSTALL_APP02 | http://applicationmarket.com/install?appId=2 |
| | | 15 | IMG_APP02 | http://applicationmarket.com/images/meeting_material_copy.jpg |
| | | 16 | WORD_APP02_TITLE_JP | CONFERENCE MATERIAL COPY |
| COMMON RESOURCES (JAPANESE) | | 19 | WORD_APP02_DESC_JP | COPYING CAN BE EASILY PERFORMED WITH A STYLE SUITABLE FOR MATERIALS DISTRIBUTED IN A CONFERENCE |
| | | 6 | STYLE_JP | http://applicationmarket.com/css/style_jp.css |
| RSG_BASIC_EN | COMMON RESOURCES (ENGLISH) | 1 | IMG_TITLE | http://applicationmarket.com/images/title.jpg |
| | | 3 | WORD_TITLE_EN | Application Market |
| | | 5 | WORD_DESC_EN | Feel free to use! |
| | | 8 | IMG_APP01 | http://applicationmarket.com/images/id_card_copy.jpg |
| | | 9 | LINK_INSTALL_APP01 | http://applicationmarket.com/install?appId=1 |
| | | 11 | WORD_APP01_TITLE_EN | ID Card Copy |
| | | 13 | WORD_APP01_DESC_EN | ID cards can be copied on a sheet of paper. |
| | | 14 | LINK_INSTALL_APP02 | http://applicationmarket.com/install?appId=2 |
| | | 15 | IMG_APP02 | http://applicationmarket.com/images/meeting_material_copy.jpg |
| | | 17 | WORD_APP02_TITLE_EN | Meeting Material Copy |
| COMMON RESOURCES (ENGLISH) | | 20 | WORD_APP02_DESC_EN | You can copy meeting materials with appropriate style settings. |
| | | 7 | STYLE_EN | http://applicationmarket.com/css/style_en.css |
| RSG_JAPAN_DIRECT_JP | RESOURCES OF COMPANY STORE IN JAPAN (JAPANESE) | 22 | LINK_INSTALL_APP03 | http://applicationmarket.com/install?appId=3 |
| | | 23 | IMG_APP03 | http://applicationmarket.com/images/easy_scan.jpg |
| | | 24 | WORD_APP03_TITLE_JP | SIMPLE SCAN |
| COMPANY STORE IN JAPAN (JAPANESE) | | 26 | WORD_APP03_DESC_JP | SCANNING FUNCTION CAN BE USED SIMPLY AND EASILY |
| RSG_JAPAN_DIRECT_EN | RESOURCES OF COMPANY STORE IN JAPAN (ENGLISH) | 22 | LINK_INSTALL_APP03 | http://applicationmarket.com/install?appId=3 |
| | | 23 | IMG_APP03 | http://applicationmarket.com/images/easy_scan.jpg |
| COMPANY STORE IN JAPAN (ENGLISH) | | 25 | WORD_APP03_TITLE_EN | Easy Scan |
| | | 27 | WORD_APP03_DESC_EN | You can use scan function very easily. |
| RSG_JAPAN_DEALER_JP | RESOURCES OF AGENCY IN JAPAN | 28 | LINK_INSTALL_APP04 | http://applicationmarket.com/install?appId=4 |
| | | 29 | IMG_APP04 | http://applicationmarket.com/images/ippatsu_scan.jpg |
| AGENCY IN JAPAN | | 30 | WORD_APP04_TITLE_JP | ONE SHOT SCAN |
| | | 31 | WORD_APP04_DESC_JP | SCANNING CAN BE MADE BY ONE SHOT |
| RSG_US_DIRECT_EN | RESOURCES OF COMPANY STORE IN NORTH AMERICA | 14 | LINK_INSTALL_APP02 | http://applicationmarket.com/install?appId=2 |
| | | 15 | IMG_APP02 | http://applicationmarket.com/images/meeting_material_copy.jpg |
| COMPANY STORE IN NORTH AMERICA | | 18 | WORD_APP02_TITLE_EN | Conference Material Copy |
| | | 21 | WORD_APP02_DESC_EN | Ensures appropriate use of copy for conference. |

FIG.12

| CONTENT ID | CONTENT NAME | SUCCES-SION ORDER | CONDITION INDICATING ATTRIBUTE | RESOURCE GROUP ID |
|---|---|---|---|---|
| CONTENTS_JAPAN_DIRECT | CONTENTS OF JAPAN DIRECT SHOP | 1 | DISPLAY LANGUAGE IS JAPANESE | RSG_BASIC_JP |
| | | 2 | DISPLAY LANGUAGE IS ENGLISH | RSG_BASIC_EN |
| | | 3 | DISPLAY LANGUAGE IS JAPANESE | RSG_JAPAN_DIRECT_JP |
| | | 4 | DISPLAY LANGUAGE IS ENGLISH | RSG_JAPAN_DIRECT_EN |
| CONTENTS_JAPAN_DEALER | CONTENTS OF AGENCY IN JAPAN | 1 | NO CONDITION | RSG_BASIC_JP |
| | | 2 | NO CONDITION | RSG_JAPAN_DEALER_JP |
| CONTENTS_US_DIRECT | CONTENT OF US DIRECT SHOP | 1 | NO CONDITION | RSG_BASIC_EN |
| | | 2 | NO CONDITION | RSG_US_DIRECT_EN |

FIG.13

| IMAGE NAME | BINARY DATA |
|---|---|
| title.jpg | 0x47494638361500031OOF700000000008··· |
| id_card_copy.jpg | 0x47494638361500031OOF7000000FFFFF··· |
| meeting_material_copy.jpg | 0x47494638361500031OOF7000000EEEEE··· |
| easy_scan.jpg | 0x47494638361500031OOF7000000BBBB··· |
| ippatsu_scan.jpg | 0x47494638361500031OOF7000000CCCC··· |

FIG.14

| USER NAME | PASSWORD | AFFILIATED USER GROUP |
|---|---|---|
| UserA | ************ | JAPAN DIRECT SHOP |
| UserB | ************ | JAPAN DIRECT SHOP |
| UserC | ************ | AGENCY IN JAPAN |
| UserD | ************ | AGENCY IN JAPAN |
| UserE | ************ | US DIRECT SHOP |

FIG.15

| AFFILIATED USER GROUP |
|---|
| JAPAN DIRECT SHOP |
| AGENCY IN JAPAN |
| US DIRECT SHOP |

FIG.16

| AFFILIATED USER GROUP | ALLOWED RESOURCE GROUP | DESCRIPTION OF RESOURCE GROUP |
|---|---|---|
| JAPAN DIRECT SHOP | RSG_BASIC_JP | COMMON RESOURCES (JAPANESE) |
| | RSG_BASIC_EN | COMMON RESOURCES (ENGLISH) |
| | RSG_JAPAN_DIRECT_JP | RESOURCES OF COMPANY STORE IN JAPAN (JAPANESE) |
| | RSG_JAPAN_DIRECT_EN | RESOURCES OF COMPANY STORE IN JAPAN (ENGLISH) |
| AGENCY IN JAPAN | RSG_BASIC_JP | COMMON RESOURCES (JAPANESE) |
| | RSG_JAPAN_DEALER_JP | RESOURCES OF AGENCY IN JAPAN |
| US DIRECT SHOP | RSG_BASIC_EN | COMMON RESOURCES (ENGLISH) |
| | RSG_US_DIRECT_EN | RESOURCES OF COMPANY STORE IN NORTH AMERICA |
| | | |

FIG.18A

| RESOURCE ID | RESOURCE NAME | RESOURCE VALUE |
|---|---|---|
| 1 | IMG_TITLE | http://applicationmarket.com/images/title.jpg |
| 3 | WORD_TITLE_EN | Application Market |
| 5 | WORD_DESC_EN | Feel free to use! |
| 8 | IMG_APP01 | http://applicationmarket.com/images/id_card_copy.jpg |
| 9 | LINK_INSTALL_APP01 | http://applicationmarket.com/install?appId=1 |
| 11 | WORD_APP01_TITLE_EN | ID Card Copy |
| 13 | WORD_APP01_DESC_EN | ID cards can be copied on a sheet of paper. |
| 14 | LINK_INSTALL_APP02 | http://applicationmarket.com/install?appId=2 |
| 15 | IMG_APP02 | http://applicationmarket.com/images/meeting_material_copy.jpg |
| 17 | WORD_APP02_TITLE_EN | Meeting Material Copy |
| 20 | WORD_APP02_DESC_EN | You can copy meeting materials with appropriate style settings. |
| 7 | STYLE_EN | http://applicationmarket.com/css/style_en.css |

FIG.18B

| RESOURCE ID | RESOURCE NAME | RESOURCE VALUE |
|---|---|---|
| 1 | IMG_TITLE | http://applicationmarket.com/images/title.jpg |
| 3 | WORD_TITLE_EN | Application Market |
| 5 | WORD_DESC_EN | Feel free to use! |
| 8 | IMG_APP01 | http://applicationmarket.com/images/id_card_copy.jpg |
| 9 | LINK_INSTALL_APP01 | http://applicationmarket.com/install?appId=1 |
| 11 | WORD_APP01_TITLE_EN | ID Card Copy |
| 13 | WORD_APP01_DESC_EN | ID cards can be copied on a sheet of paper. |
| 14 | LINK_INSTALL_APP02 | http://applicationmarket.com/install?appId=2 |
| 15 | IMG_APP02 | http://applicationmarket.com/images/meeting_material_copy.jpg |
| 18 | WORD_APP02_TITLE_EN | Conference Material Copy |
| 21 | WORD_APP02_DESC_EN | Ensures appropriate use of copy for conference. |
| 7 | STYLE_EN | http://applicationmarket.com/css/style_en.css |

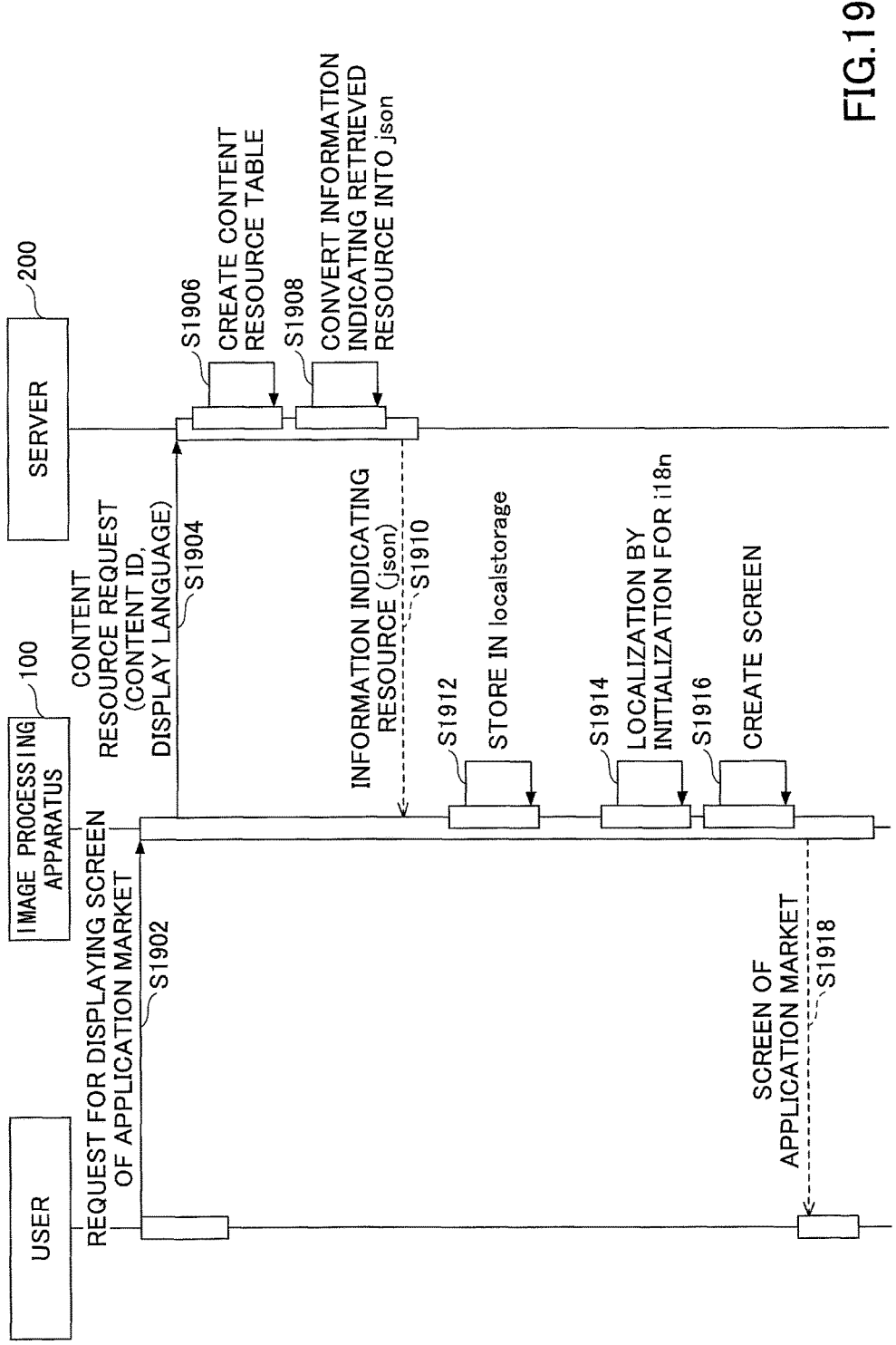

FIG.20

```
<!DOCTYPE html>
<html>

<head>
          <title>Application Market</title>

<script src="http://code.jquery.com/jquery-1.7.min.js"></script>
          <script src="../../bin/i18next-latest.js"></script>
</head>

<body>
   <span id="title">Title</span>
   <span id="desc">Title</span>

<!-- ID CARD COPY-->
   <img src="app01Img">
   <span id="app01Title"></span>
   <span id="app01Desc"></span>

<!-- CONFERENCE MATERIAL COPY-->
   <img src="app02Img">
   <span id="app02Title"></span>
   <span id="app02Desc"></span>

<!-- SIMPLE SCAN-->
   <img src="app03Img">
   <span id="app03Title"></span>
   <span id="app03Desc"></span>

<script>
$.i18n.init({
  //lng: 'ja-JP',
  resGetPath: "PATH OF CONTENT RETRIEVAL UNIT",
  ns: { namespaces: ['ns.common'], defaultNs: 'ns.special'},
  useLocalStorage: true,
  debug: true
}, function(t) {
   $('#title').text($.t('ns.common:WORD_TITLE'));
   $('#desc').text($.t('ns.common:WORD_DESC'));
   $('#app01Img').src($.t('ns.common:IMG_APP01'));
   $('#app01Link').href($.t('ns.common:LINK_INSTALL_APP01'));
   $('#app01Title').text($.t('ns.common:WORD_APP01_TITLE'));
   $('#app01Desc').text($.t('ns.common:WORD_APP01_DESC'))
   $('#app02Img').src($.t('ns.common:IMG_APP01'));
   $('#app02Link').href($.t('ns.common:LINK_INSTALL_APP01'));
   $('#app02Title').text($.t('ns.common:WORD_APP01_TITLE'));
   $('#app02Desc').text($.t('ns.common:WORD_APP01_DESC'))
   $('#app03Img').src($.t('ns.common:IMG_APP01'));
   $('#app03Link').href($.t('ns.common:LINK_INSTALL_APP01'));
   $('#app03Title').text($.t('ns.common:WORD_APP01_TITLE'));
   $('#app03Desc').text($.t('ns.common:WORD_APP01_DESC'))
```

FIG.24

RESOURCE LIST

[ADDITION OF RESOURCE]

| RESOURCE_ID | RESOURCE NAME | RESOURCE VALUE | | |
|---|---|---|---|---|
| 1 | IMG_TITLE | http://applicationmarket.com/images/title.jpg | UPDATE | DELETE |
| 2 | WORD_TITLE_JP | APPLICATION MARKET | UPDATE | DELETE |
| 3 | WORD_TITLE_EN | Application Market | UPDATE | DELETE |
| 4 | WORD_DESC_JP | LET'S USE IT FOR TRIAL | UPDATE | DELETE |
| 5 | WORD_DESC_EN | Feel free to use! | UPDATE | DELETE |

FIG.26

LIST OF RESOURCE GROUP

RESOURCE GROUP ID: [          ]  ADDITION OF RESOURCE GROUP

| RESOURCE GROUP ID | DESCRIPTION | | |
|---|---|---|---|
| RSG_BASIC_JP | COMMON RESOURCES (JAPANESE) | EDIT | DELETE |
| RSG_BASIC_EN | COMMON RESOURCES (ENGLISH) | EDIT | DELETE |
| RSG_JAPAN_DIRECT_JP | RESOURCES OF COMPANY STORE IN JAPAN (JAPANESE) | EDIT | DELETE |
| RSG_JAPAN_DIRECT_EN | RESOURCES OF COMPANY STORE IN JAPAN (ENGLISH) | EDIT | DELETE |
| RSG_JAPAN_DEALER_JP | RESOURCES OF AGENCY IN JAPAN | EDIT | DELETE |
| RSG_US_DIRECT_EN | RESOURCES OF COMPANY STORE IN NORTH AMERICA | EDIT | DELETE |

FIG.27

LIST OF RESOURCE GROUP

RESOURCE GROUP: COMMON RESOURCES (JAPANESE)

RESOURCE ID: [ ]

[ADDITION OF RESOURCE]

[SET UP RIGHT]

| RESOURCE ID | RESOURCE NAME | RESOURCE VALUE | |
|---|---|---|---|
| 1 | IMG_TITLE | http://applicationmarket.com/images/title.jpg | DELETE |
| 2 | WORD_TITLE_JP | APPLICATION MARKET | DELETE |
| 4 | WORD_DESC_JP | LET'S USE IT FOR TRIAL | DELETE |
| 8 | IMG_APP01 | http://applicationmarket.com/images/id_card_copy.jpg | DELETE |
| 9 | LINK_INSTALL_APP01 | http://applicationmarket.com/install?appId=1 | DELETE |
| 10 | WORD_APP01_TITLE_JP | ID CARD COPY | DELETE |

FIG.28

SET UP RIGHT OF RESOURCE GROUP

RESOURCE GROUP: COMMON RESOURCES (JAPANESE)

PLEASE SELECT USER GROUP ALLOWED TO ACCESS THIS RESOURCE GROUP, AND CHECK IT

| USER GROUP NAME | ALLOW |
|---|---|
| HEADQUARTERS | ☑ |
| JAPANESE SALES SUPERVISORY DEPARTMENT | ☑ |
| US SALES SUPERVISORY DEPARTMENT | ☑ |
| UK SALES SUPERVISORY DEPARTMENT | ☑ |
| COMPANY STORE IN JAPAN | ☑ |
| AGENCY IN JAPAN | ☑ |
| COMPANY STORE IN US | ☑ |
| AGENCY IN US | ☑ |
| COMPANY STORE IN UK | ☑ |

SET UP

FIG.29

CONTENT LIST SCREEN

CONTENT ID:

CONTENT NAME:

ADDITION OF CONTENT

| CONTENT ID | CONTENT NAME | | |
|---|---|---|---|
| CONTENTS_JAPAN_DIRECT | CONTENT OF JAPAN DIRECT SHOP | EDIT | DELETE |
| CONTENTS_JAPAN_DEALER | CONTENT OF AGENCY IN JAPAN | EDIT | DELETE |
| CONTENTS_US_DIRECT | CONTENT OF US DIRECT SHOP | EDIT | DELETE |

FIG.30

CONTENT EDIT SCREEN

CONTENT NAME: CONTENT OF JAPAN DIRECT SHOP

RESOURCE GROUP ID: ☐

CONDITION: ☐

[ADDITION OF RESOURCE GROUP]

| NO. | RESOURCE GROUP ID | CONDITION INDICATING ATTRIBUTE | | |
|---|---|---|---|---|
| 1 | RSG_BASIC_JP | DISPLAY LANGUAGE IS JAPANESE | ◀ | ▶ |
| 2 | RSG_BASIC_EN | DISPLAY LANGUAGE IS ENGLISH | ◀ | ▶ |
| 3 | RSG_JAPAN_DIRECT_JP | DISPLAY LANGUAGE IS JAPANESE | ◀ | ▶ |
| 4 | RSG_JAPAN_DIRECT_EN | DISPLAY LANGUAGE IS ENGLISH | ◀ | ▶ |

INFORMATION PROCESSING APPARATUS, INFORMATION PROCESSING METHOD, AND INFORMATION PROCESSING SYSTEM

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/067872 filed on Jun. 16, 2016 and designating the U.S., which claims priority to Japanese Patent Application No. 2015-134962 filed on Jul. 6, 2015. The entire contents of the foregoing applications are incorporated herein by reference.

BACKGROUND OF THE INVENTION

1. Field of the Invention

The present disclosure relates to an information processing apparatus, an information processing method, and an information processing system.

2. Description of the Related Art

Information provision via a network is performed while localized in each country around the world. Words to be displayed on a screen via a network can be switched in accordance with a language configured in a browser or an application, and the words can be provided.

A method has been known such that a plurality of components to be displayed on a screen is grouped, and localization is specified on a group basis (cf. Patent Document 1 (Japanese Unexamined Patent Publication NO. 2003-186733), for example).

In some cases, by the localization, a layout of components to be displayed on a screen and an image, etc., to be used for displaying may be switched, in addition to the words. Further, words to be displayed on a screen may be switched in accordance with a language configured by a browser or an application, or may be switched in accordance with cultural differences. Here, the case of switching based on a culture implies, for example, a case in which, even if a language is English, the language is divided into American English and British English depending on the culture.

When a screen is to be switched for localization, so far, an individual screen is prepared for each region of the localization. Accordingly, the items with the same contents are to be maintained for a screen for each region, and data (resource) is maintained in a duplicated manner. For example, suppose that there are "Tokyo" and "Osaka," as regions of the localization. Though a part of words is to be localized for "Osaka," many words are the same for a screen for "Tokyo" and a screen for "Osaka." However, in a method used so far, the words that are the same as the words configured for "Tokyo" are prepared and maintained for the screen for "Osaka."

It is desirable to manage elements of a screen in a parent-child relation and to reduce data (resource) for localization.

SUMMARY OF THE INVENTION

According to an aspect of the present invention, there is provided an information processing apparatus for providing, via a network, information indicating a resource to be displayed on a screen of a client device, the information processing apparatus including a resource manager configured to store a plurality of resources, wherein each of the plurality of resources belongs to one of a plurality of resource groups, each of the plurality of resource groups belongs to a content item, display priority orders are respectively assigned to two or more of the resource groups when the two or more of the resource groups belong to the content item, and identification information is attached to the content item; a receiver configured to receive, from the client device, the identification information of the content item; a selector configured to select, based on the identification information of the content item and the priority orders for displaying, a resource to be displayed on the screen of the client device from the plurality of resources; and a transmitter configured to transmit information indicating the resource to the client device.

According to a disclosed embodiment, data (resource) for the localization can be reduced by managing elements of a screen in a parent-child relation. Other objects, features and advantages of the present invention will become more apparent from the following detailed description when read in conjunction with the accompanying drawings.

BRIEF DESCRIPTION OF THE DRAWINGS

FIG. 5 is a diagram illustrating an example (version 3) of displaying the application market screen;

FIG. 10 is a diagram illustrating an example of a resource management table;

FIG. 11 is a diagram illustrating an example of the resource management table;

FIG. 12 is a diagram illustrating an example of a content management table

FIG. 13 is a diagram illustrating an example of an image table;

FIG. 14 is a diagram illustrating an example of a user management table;

FIG. 15 is a diagram illustrating an example of a user group management table;

FIG. 16 is a diagram illustrating an example of a rights management table;

FIG. 18A is a diagram for illustrating an example of an operation of the image processing apparatus according to the first embodiment, which is a diagram illustrating an example of a content resource table at a time of a first loop in the flow of FIG. 17;

FIG. 18B is a diagram for illustrating an example of the operation of the image processing apparatus according to the first embodiment, which is a diagram illustrating an example of the content resource table at a time of a second loop in the flow of FIG. 17;

FIG. 19 is a sequence diagram illustrating an example of an operation of the image processing system according to the first embodiment;

FIG. 20 is a diagram illustrating an example of content of an HTML file returned to a web browser installed in the image processing apparatus;

FIG. 24 is a diagram illustrating an example of a configuration screen of the resource management table;

FIG. 26 is a diagram illustrating an example of a configuration screen of the resource group management table;

FIG. 27 is a diagram illustrating an example of a screen for editing a resource group;

FIG. 28 is a diagram illustrating an example of a screen for adding an access right to a resource group;

FIG. 29 is a diagram illustrating an example of a configuration screen of a content management table; and FIG. 30 is a diagram illustrating an example of a screen for editing content.

DESCRIPTION OF THE PREFERRED EMBODIMENTS

Figure 1:
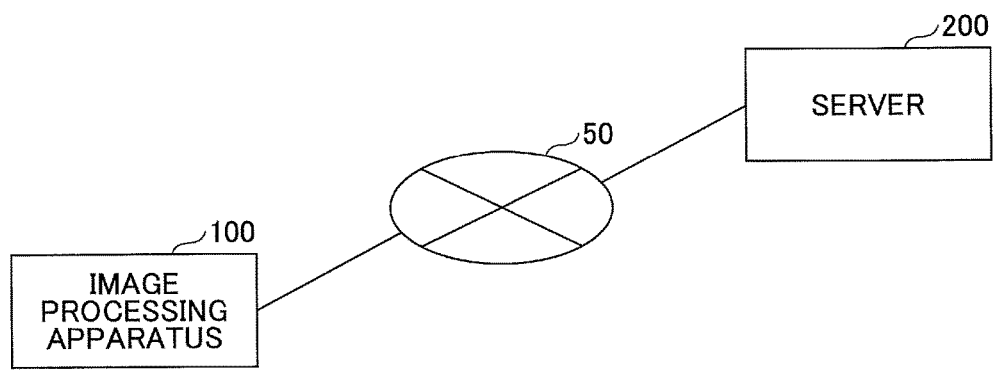
FIG. 1 is a diagram illustrating an example of a configuration of an image processing system according to a first embodiment.

In the following, embodiments of the present disclosure are described. The embodiments described below are merely examples, and the present invention is not limited to the illustrative embodiments set forth in the specification.

Note that, in all the drawings for illustrating the embodiments, the same reference numerals may be used for components provided with the same functions, and duplicate descriptions may be omitted.

First Embodiment

<Image Processing System>

FIG. 1 illustrates an image processing system according to a first embodiment.

The image processing system is provided with an image processing apparatus 100 and a server 200. Examples of the image processing apparatus 100 are a printer, a scanner, a copy machine, a facsimile machine, and a multifunction peripheral (MFP (Multi Function Peripheral)) provided with these functions. Further, a function of the image processing apparatus 100 described below may be applied to a device other than a device provided with a print function, such as a projector provided with a function for forming an image for projection, display, etc., and an electronic black board device.

The image processing apparatus 100 is mutually coupled to the server 200 through a communication network 50. The communication network 50 is not particularly limited. Ethernet (registered trademark), a LAN (Local Area Network) based on a transaction protocol, such as the TCP/IP (Transmission Control Protocol/Internet Protocol), a VPN (Virtual Private Network), a WAN (Wide Area Network) to be coupled using a dedicated line, etc., can be used as the communication network 50.

The image processing apparatus 100 accesses the server 200 and retrieves (i.e., selects), from the server 200, information indicating an element (resource) of an application market screen (marketplace). The image processing apparatus 100 creates a screen of the market place using the element and displays the screen. In the first embodiment, an application market screen for the image processing apparatus 100 is displayed on the image processing apparatus 100. Here, as for the application market, a sales structure of the image processing apparatus is described as an example of a business model.

Figure 2:
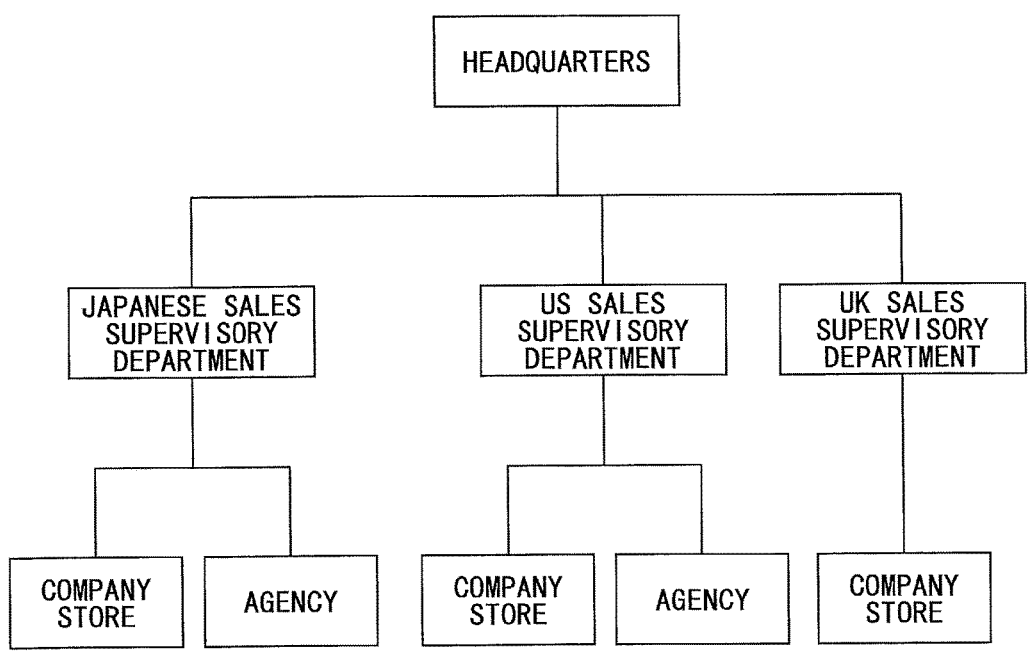
FIG. 2 is a diagram illustrating an example of a sales structure of an image processing apparatus.

FIG. 2 illustrates an example of a sales structure of the image processing apparatus.

In the industry of image processing apparatuses, such as a multifunction peripheral, multifunction peripherals are sold based on the sales structure, such as that of illustrated in FIG. 2. For example, under the head quarters, the Japanese sales supervisory department for supervising sales in Japan, the US sales supervisory department for supervising sales in the United States, the UK sales supervisory department for supervising sales in the UK, etc., are provided. Further, under the Japanese sales supervisory department, a company store that is a store directly operated by the Japanese sales supervisory department and an agency that sells on behalf of the Japanese sales supervisory department are provided. Further, under the US sales supervisory department, a company store that is a store directly operated by the US sales supervisory department and an agency that sells on behalf of the US sales supervisory department are provided. Furthermore, under the UK sales supervisory department, a company store that is a store directly operated by the UK sales supervisory department is provided.

A link to a web application is embedded in an application market screen displayed on a multifunction peripheral, which is sold in such a manner. During embedding of the link in the web application, for each multifunction peripheral sold at each store, display content is changed as the application market screen is localized.

For example, a group of applications to be sold through the Japanese sales supervisory department is different from a group of applications to be sold through the US sales supervisory department. For the group of the applications to be sold through the US sales supervisory department, the display language of the application market screen is English. Further, for a multifunction peripheral sold in an agency, a web application created by the agency may be displayed, instead of a web application created by a company store.

<A Display Example of the Application Market Screen>

Figure 3:
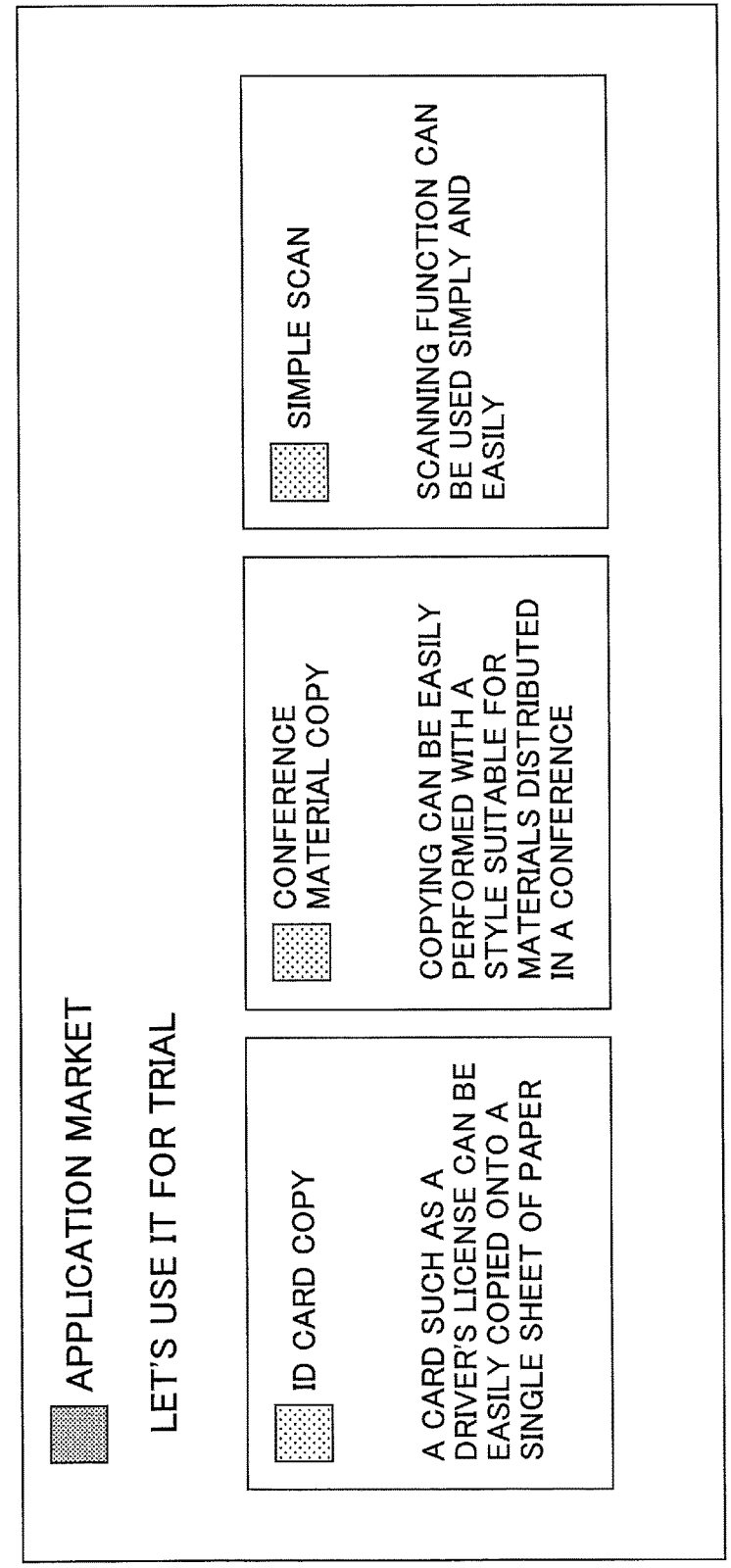
FIG. 3 is a diagram illustrating an example (version 1) of displaying an application market screen.
Figure 4:
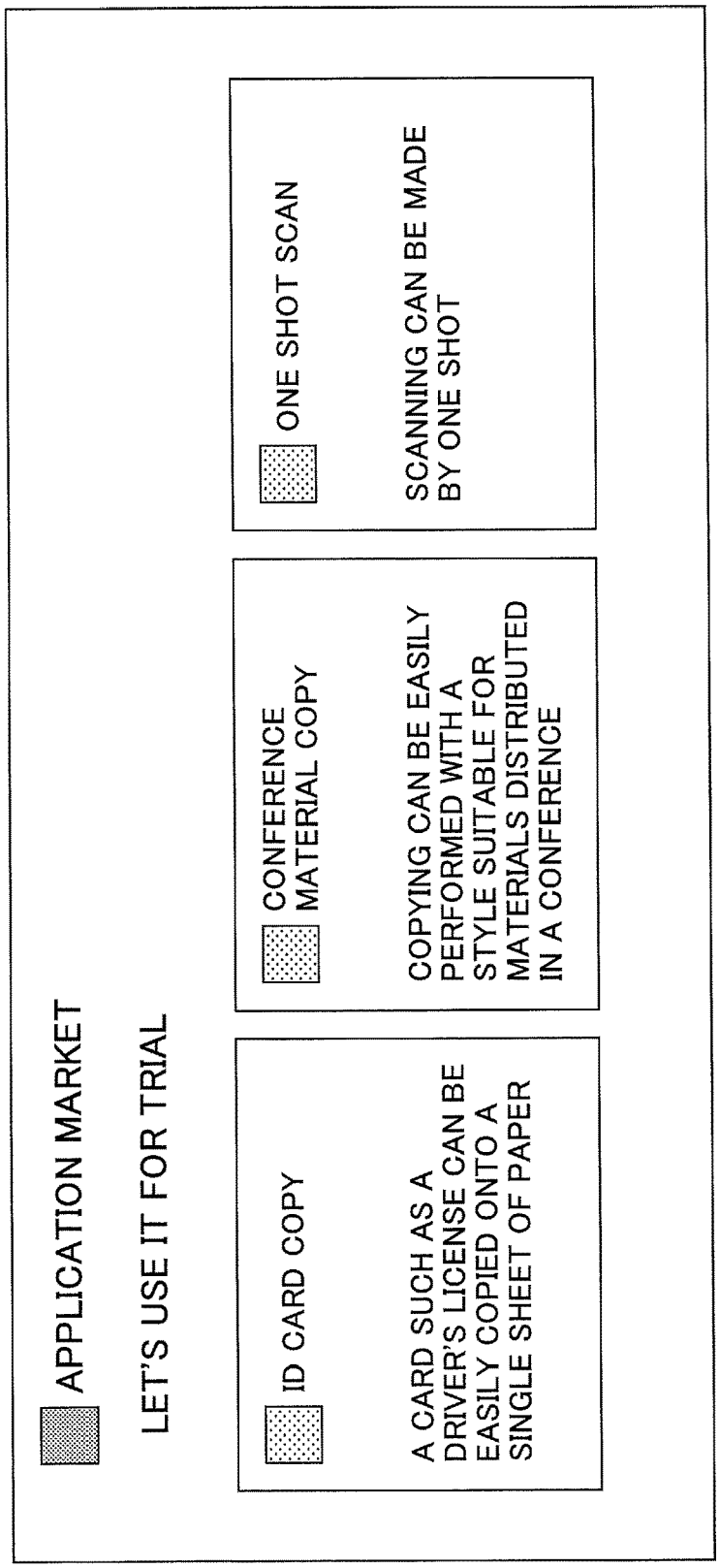
FIG. 4 is a diagram illustrating an example (version 2) of displaying the application market screen.

A display example of the application market screen is described by referring to FIG. 3 through FIG. 5. FIG. 3 illustrates an example of the application market screen embedded in the image processing apparatus 100, which is sold in a company store in Japan. As illustrated in FIG. 3, on the screen on which the words "application market" are displayed, the words "ID card copy," "conference material copy," and "simple scan" are displayed.

Among these words, a display part of the words "ID card copy" is to be pressed by a user for installing an application for executing a function for copying a card, such as a driver's license.

The display part of the words "conference material copy" is pressed by a user for installing an application for executing a function for copying materials distributed at a conference.

The display part of the words "simple scan" is pressed by a user for installing an application for executing a scanning function.

FIG. 4 illustrates an example of an application market screen embedded in the image processing apparatus 100, which is sold through an agency in Japan. As illustrated in FIG. 4, on the screen on which the words "application market" are displayed, the words "ID card copy," "conference material copy," and "one shot scan" are displayed.

Among these words, the words "ID card copy" and "conference material copy" respectively have the same meanings as the similar words on the application market screen embedded in the image processing apparatus 100 soled in the company store in Japan.

The words "one shot scan" are pressed for installing an application that is similar to the application installed when the words "simple scan" are selected. The words are pressed by a user for installing an application for executing a scanning function.

Comparing the example illustrated in FIG. 4 with the screen illustrated in FIG. 3, in the screen illustrated in FIG. 4, the words "one shot scan" are displayed, instead of the words "simple scan."

FIG. 5 illustrates an example of the application market screen embedded in the image processing apparatus 100, which is sold through a company store in the United States. The application market screen embedded in the image processing apparatus 100 sold through the company store in the United States is displayed in English.

As illustrated in FIG. 5, on the screen on which the words "Application Market" are displayed, the words "ID Card Copy" and "Conference Material Copy" are displayed. Among these words, the words "ID Card Copy" and "Conference Material Copy" respectively have the same meanings as the meanings of the words "ID card copy" and "conference material copy" displayed on the application market screen embedded in the image processing apparatus 100 sold by a company store in Japan.

The screen illustrated in FIG. 5 is different from the application market screen embedded in the image processing apparatus 100 sold by a company store or an agency in Japan. Namely, on the screen illustrated in FIG. 5, the words are not displayed which is to be selected for installing an application other than the applications for executing the functions respectively corresponding to the words "ID Card Copy" and "Conference Material Copy."

<Resource, Resource Group, and Content>

Figure 6:
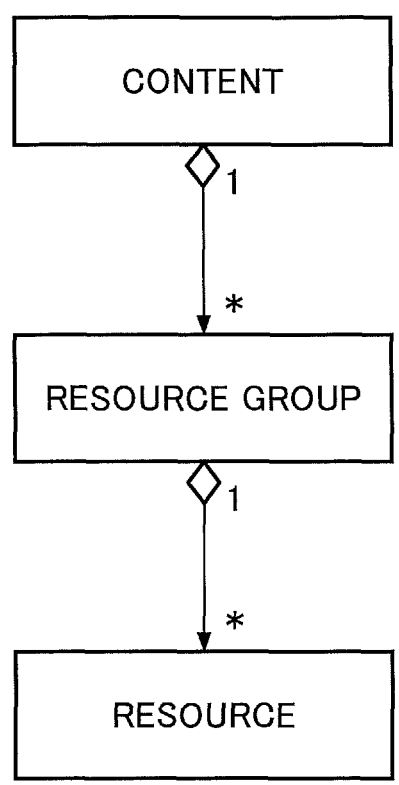
FIG. 6 is a diagram illustrating a relation among a resource, a resource group, and content.

FIG. 6 illustrates a relation among a resource, a resource group, and content.

A resource is an element of a screen, such as the words, "application market."

For example, a resource includes the words "application market," etc., and a URL (Uniform Resource Locator), such as "http://applicationmarket.com/images/title.jpg."

A resource group is a set of a plurality of resources. An example of the resource group is a set of resources to be commonly used for the image processing apparatuses 100 that are sold in Japan.

Content is a combination of resource groups.

As illustrated in FIG. 6, a plurality of resources is included in a resource group, and a plurality of resource groups is included in a content.

<Hardware Configuration of the Image Processing Apparatus 100>

Figure 7:
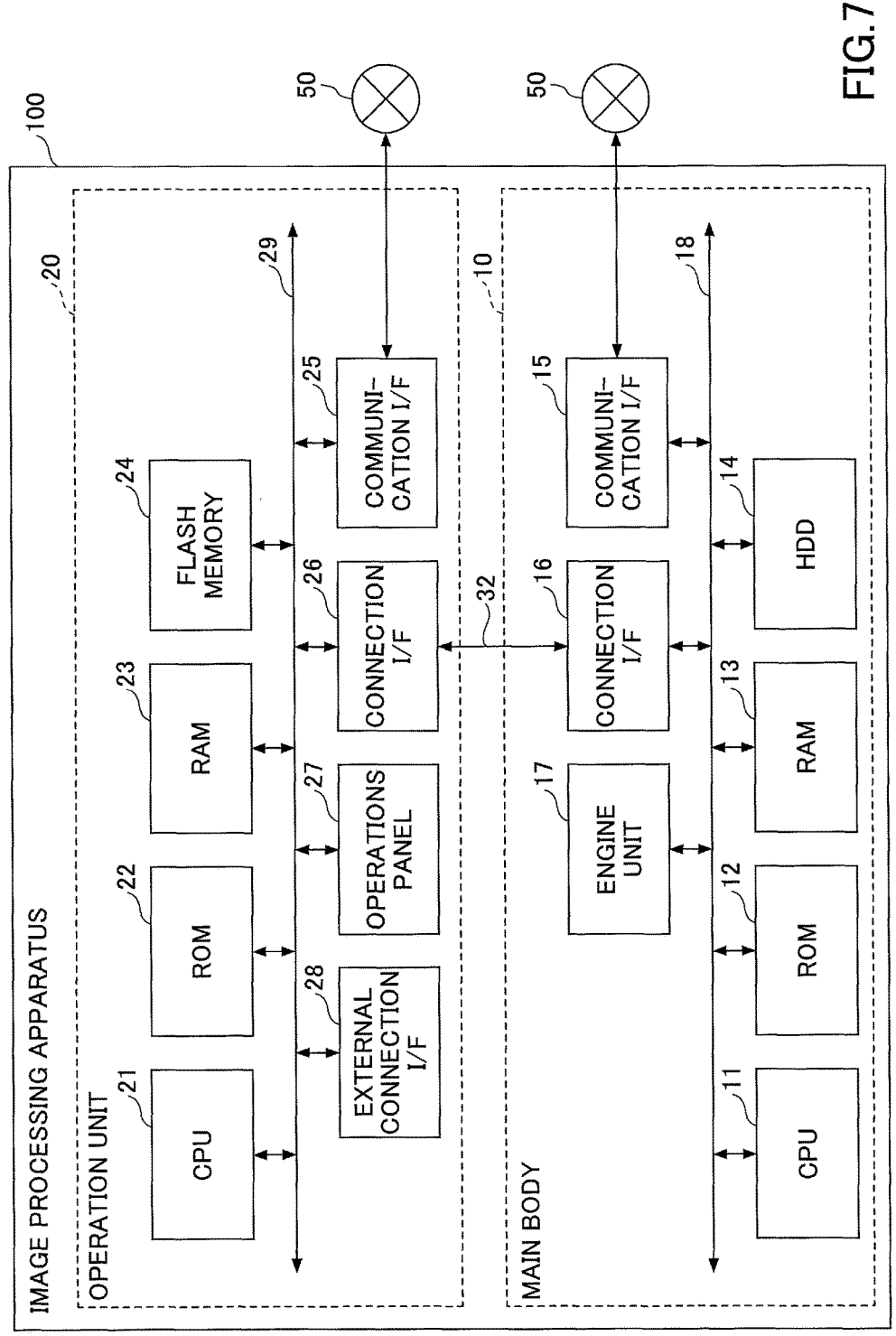
FIG. 7 is a diagram illustrating an example of a hardware configuration of the image processing apparatus according to the first embodiment.

FIG. 7 illustrates an example of a hardware configuration of the image processing apparatus 100.

The image processing apparatus 100 is provided with a main body 10 that can implement various functions, such as a copy function, a scanner function, a facsimile function, and a printer function; and an operation unit 20 for receiving an operation by a user. Note that receiving an operation by a user is a concept that includes receiving information (which includes a signal, etc., indicating coordinate values on the screen) that is input in accordance with the operation by the user.

The main body 10 and the operation unit 20 are coupled to each other, so that the main body 10 and the operation unit 20 can communicate each other through a dedicated communication path 32. As the communication path 32, for example, a communication path based on the USB (Universal Serial Bus) standard may be used; however, a communication path based on any standard may be used regardless of whether it is wired or wireless.

The main body 10 can perform an operation corresponding to an operation received by the operation unit 20. Further, the main body 10 can communicate with an external device, such as a client PC (Personal Computer), and can perform an operation corresponding to an indication received from the external device.

First, a hardware configuration of the main body 10 is described.

As illustrated in FIG. 7, the main body 10 is provided with a CPU (Central Processing Unit) 11; a ROM (Read-Only Memory) 12; a RAM (Random Access Memory) 13; an HDD (Hard Disk Drive) 14; a communication I/F (interface) 15; a connection I/F 16, and an engine unit 17. These components are coupled to each other through a system bus 18.

The CPU 11 integrally controls the operation of the main body 10. The CPU 11 controls the overall operation of the main body 10 by executing a main body program stored in the ROM 12 or the HDD 14, etc., while using the RAM 13 as a work area (working area), to implement the above-described various functions, such as the copy function, the scanner function, the facsimile function, and the printer function.

The communication I/F 15 is an interface for coupling to a communication network 50. The connection I/F 16 is an interface for communicating with the operation unit 20 through the communication path 32.

The engine unit 17 is hardware for executing general-purpose information processing and processing other than communication for implementing the copy function, the scanner function, the facsimile function, and the printer function. The engine unit 17 is provided with, for example, a scanner (an image reading unit) for scanning and reading an image of a document; a plotter (image forming unit) for printing on a sheet material, such as paper; a facsimile unit for executing facsimile communication, etc. The engine unit 17 may also be provided with a specific option, such as a finisher for sorting printed sheet materials and an ADF (automatic document feeder) for automatically feeding a document.

Next, a hardware configuration of the operation unit 20 is described.

As illustrated in FIG. 7, the operation unit 20 is provided with a CPU 21; a ROM 22; a RAM 23; a flash memory 24; a communication I/F 25; a connection I/F 26; an operations panel 27; and an external connection I/F 28, and these are coupled to each other through a system bus 29.

The CPU 21 integrally controls the operation of the operation unit 20. The CPU 21 controls the overall operation of the operation unit 20 by executing an operation unit program stored in the ROM 22 or the flash memory 24, etc., while using the RAM 23 as a work area, to implement various functions, such as displaying information (image) corresponding to an input received from a user.

The communication I/F 25 is an interface for coupling to the communication network 50. The connection I/F 26 is an interface for communicating with the main body 10 through the communication path 32.

The operations panel 27 receives various types of inputs corresponding to operations by a user and displays various types of information (e.g., information corresponding to a received operation, information indicating an operation state of the image processing apparatus 100, information indicating a configuration state, etc.). The operations panel 27 may be a liquid crystal display device (LCD: Liquid Crystal Display) in which a touch panel function is installed; however, the operations panel 27 is not limited to this. For example, the operations panel 27 may be an organic EL (Electro Luminescence) display device in which a touch panel function is installed. Furthermore, in addition to or in place of this, the operations panel 27 may be provided with an operation unit, such as a hardware key, and a display unit, such as a lamp.

The external connection I/F 28 is an interface for coupling to an external device, such as an IC card reader.

Note that the above-described main body program may be a file in an installable format or in an executable format. Then, the main body program in such a file format may be recorded in a computer readable recording medium, such as a storage media or a CD-ROM (Compact Disc Read-Only Memory), so as to be distributed. Furthermore, the main body program may be stored in the ROM 12, instead of the HDD 14. Note that, as another example of a removable recording medium, such as the CD-ROM, there are computer readable recording media, such as a CD-R (Compact Disc Recordable), a DVD (Digital Versatile Disk), and a Blu-ray Disk. The main body program may be stored in these recording media so as to be provided.

The operation unit program may also be a file in an installable format or in an executable format and may be recorded in a computer readable recording medium, such as a storage media or a CD-ROM, so as to be distributed. Furthermore, the operation unit program may be stored in the ROM 22, instead of the flash memory 24. Note that, as another example of a removable recording medium, such as the CD-ROM, there are computer readable recording media, such as the CD-R, the DVD, and the Blu-ray Disk. The operation unit program may be stored in these recording media so as to be provided.

<Hardware Configuration of the Server 200>

Figure 8:
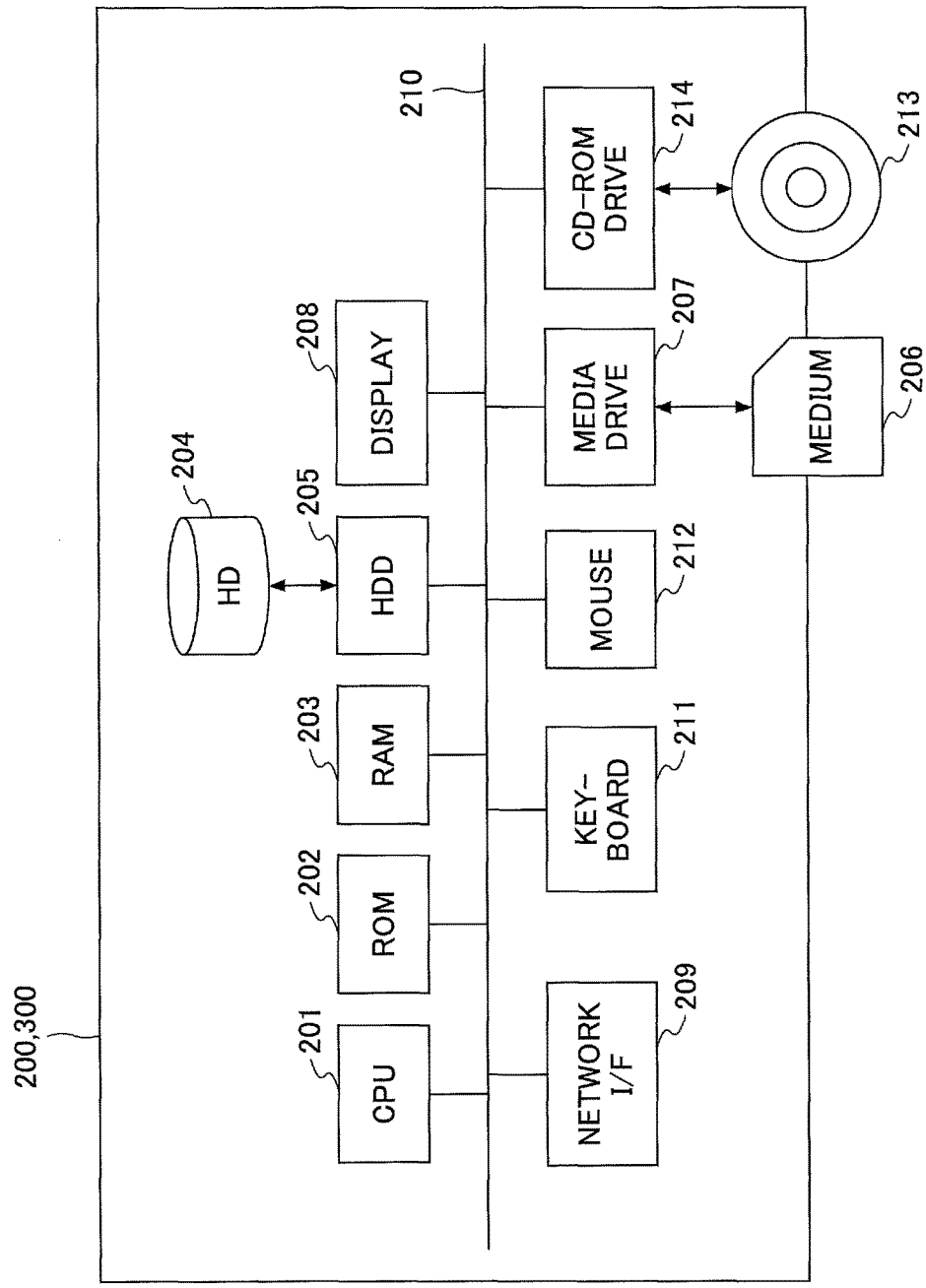
FIG. 8 is a diagram illustrating an example of a hardware configuration of a server according to the first embodiment.

FIG. 8 illustrates an example of a hardware configuration of the server 200 according to the first embodiment.

The server 200 is provided with a CPU 201 that integrally controls the operation of the server 200; and a ROM 202 that stores a program used for driving the CPU 201, such as an IPL (Initial Program Loader). The server 200 further includes a RAM 203, which is used as a work area of the CPU 201.

Further, the server 200 is provided with an HD (Hard Disk) 204 that stores various types of data, such as a server program; and an HDD 205 that controls reading or writing of various types of data with respect to the HD 204 in accordance with the control of the CPU 201. The server 200 is further provided with a media drive 207 for controlling reading and writing (storing) of data with respect to a recording medium 206, such as a flash memory.

Further, the server 200 is provided with a display 208 for displaying various types of information, such as a cursor, a menu, a window, character, an image, etc.; and a network I/F 209 for executing data transmission using the communication network 50. The server 200 is further provided with a keyboard 211 including a plurality of keys for inputting a character, a numerical value, various types of indications, etc.

Further, the server 200 is provided with a mouse 212 for executing selection and execution of various types of indications, selection of a target to be processed, motion of a cursor, etc.; and a CD-ROM drive 214 that controls reading of various types of data from a CD-ROM 213 as an example of a removable recording medium. The server 200 further includes a bus line 210, such as an address bus and a data bus, for electrically coupling the above-described components, as illustrated in FIG. 8.

Note that the server program may also be a file in an installable format or in an executable format and may be recorded in a computer readable recording medium, such as the above-described recording medium 206 or a CD-ROM 213, so as to be distributed. Furthermore, the server program may be stored in the ROM 202, instead of the HD 204. Note that, as another example of a removable recording medium, such as the CD-ROM 213, there are computer readable recording media, such as the CD-R, the DVD, and the Blu-ray Disk. The server program may be stored in these recording media so as to be provided.

<Functional Configuration of the Image Processing Apparatus 100 According to the First Embodiment>

Next, a functional configuration of the image processing apparatus according to the first embodiment is described.

Figure 9:
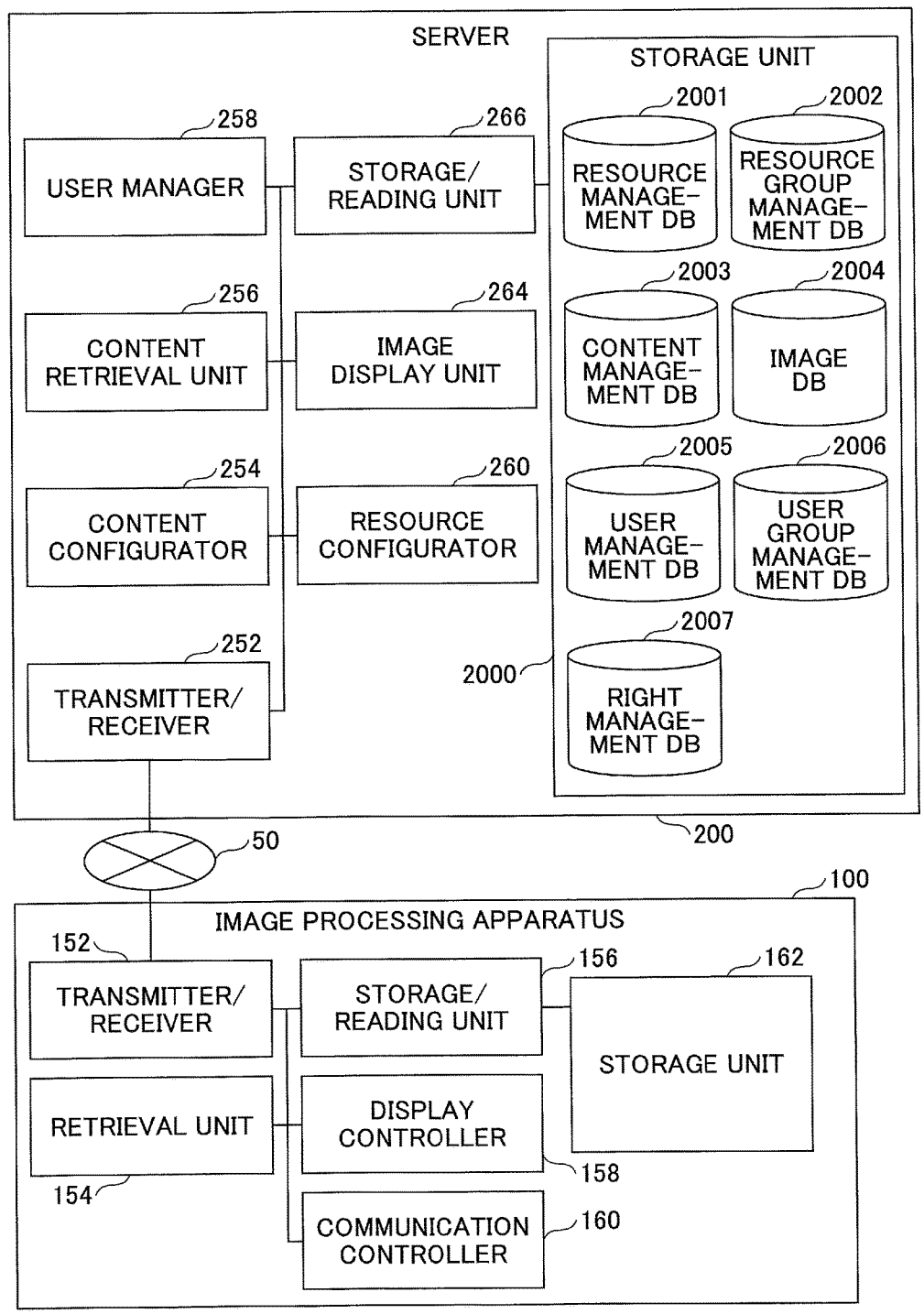
FIG. 9 is a functional block diagram of an example of the image processing system according to the first embodiment.

FIG. 9 illustrates examples of functional blocks of the operation unit 20, which is included in the image processing apparatus 100.

The operation unit 20 of the image processing apparatus 100 is provided with a transmitter/receiver 152; a retrieval unit 154; a storage/reading unit 156; a display controller 158; and a communication controller 160. Each of the above-described units is implemented by operating, by one or more of the components illustrated in FIG. 7, according to a command from the CPU 21 in accordance with the operation unit program stored in the flash memory 24. Furthermore, the operation unit 20 is provided with a storage unit 162 implemented by the flash memory 24 illustrated in FIG. 7.

<Functional Units of the Operation Unit 20>

Next, each unit of the operation unit 20 is described in detail.

The transmitter/receiver 152 of the operation unit 20 is implemented by the communication I/F 25 illustrated in FIG. 7 and a command from the CPU 21. The transmitter/receiver 152 executes transmission and reception of various types of data (information) with the server 200.

The retrieval unit 154 of the operation unit 20 is implemented by a command from the CPU 21 illustrated in FIG. 7 and a web browser stored in the flash memory 24, and retrieves information indicating a resource from the server 200.

The display controller 158 of the operation unit 20 is implemented by the operations panel 27 illustrated in FIG. 7 and a command from the CPU 21. The display controller 158 controls displaying of a resource based on the information indicating the resource retrieved by the retrieval unit 154.

Here, "displaying a resource" implies that, when the resource is a URL of an image, the image is retrieved by the URL, and that the image is displayed on a screen; and, when the resource is words, "displaying a resource" implies that the words are displayed on the screen. Further, "displaying a resource" implies that, when the resource is a link to a URL, the link is configured on the screen. Furthermore, "displaying a resource" implies that, when the resource is a URL of a style sheet, the style sheet is retrieved by the URL, and that a position, a color, a size, etc., of a display component on a screen are controlled in accordance with the style sheet.

The communication controller 160 of the operation unit 20 is implemented by a command from the CPU 21 illustrated in FIG. 7 and the communication I/F 25. The communication controller 160 controls communication between the image processing apparatus 100 and the server 200.

The storage/reading unit 156 of the operation unit 20 is implemented by a command from the CPU 21 illustrated in FIG. 7 and the operation unit program stored in the flash memory 24. The storage/reading unit 156 executes a process of storing various types of data in the storage unit 162 and a process of reading out various types of data stored in the storage unit 162.

The storage unit 162 of the operation unit 20 is implemented by the ROM 22 and the flash memory 24 illustrated in FIG. 7. The storage unit 162 stores the web browser and the operation unit program.

<Functional Configuration of the Server 200 According to the First Embodiment>

With reference to FIG. 9, an example of a functional configuration of a server according to the first embodiment is described.

The server 200 is provided with a transmitter/receiver 252; a content configurator 254; a content retrieval unit 256; a user manager 258; a resource configurator 260; an image display unit 264; and a storage/reading unit 266. Each of these components is implemented by operations of some components illustrated in FIG. 8, which are caused by an indication from the CPU 201 according to the server program stored in the HD 204. Further, the server 200 is provided with a storage unit 2000, which is implemented by the HD 204 illustrated in FIG. 8.

(Resource Management Table)

In the storage unit 2000, a resource management DB 2001 is stored, which is provided with a content of a resource management table, such as that of illustrated in FIG. 10. By the resource management table, a resource ID indicating information for uniquely identifying a resource, a resource name indicating a name of the resource, and a resource value are associated (i.e., linked) with each other to be managed. An example of a resource ID is represented by a numerical value. A resource name is a label of a resource and includes information indicating a type of the resource.

For example, a resource name includes information indicating that the type of the resource is one of a URL of an image, words, a link to a URL, and a URL of a style sheet.

An example of information indicating a URL of an image is "IMG_xxxxxx," and an example of information indicating a URL of an image that is words is "WORD_xxxxxx." Further, an example of information indicating a link to a URL is "LINK_xxxxxx," and an example of information indicating a URL of a style sheet is "STYLE_xxxxxx."

Furthermore, a resource name includes information indicating a language. Examples of information indicating a language are JP (Japanese) and EN (English).

The same resource names may be associated with different resource IDs, respectively.

(Resource Group Management Table)

The storage unit 2000 further stores a resource group management DB 2002, which is provided with a content of a resource group management table, such as that of illustrated in FIG. 11. By the resource group management table, a resource group ID that is information for identifying a resource group, a description of a resource included in the resource group, and a resource ID of the resource included in the resource group are associated with each other to be managed. In FIG. 11, in order to facilitate understanding of the resource group management table, the resource names and the resource values are indicated.

In the example of FIG. 11, the resource group ID of a resource group that is a set of resources to be commonly used in the image processing apparatus 100 to be sold in the Japanese language is "RSG_BASIC_JP."

Further, the resource group ID of a resource group that is a set of resources to be commonly used in the image processing apparatus 100 to be sold in the English language is "RSG_BASIC_EN."

Further, the resource group ID of a resource group that is a set of resources to be used in the image processing apparatus 100 to be sold by a company store in Japan in the Japanese language is "RSG_JAPAN_DIRECT_JP."

Further, a resource group ID of a resource group that is a set of resources to be used in the image processing apparatus 100 to be sold by a company store in Japan in the English language is "RSG_JAPAN_DIRECT_EN."

Further, a resource group ID of a resource group that is a set of resources to be used in the image processing apparatus 100 to be sold by an agency in Japan in the Japanese language is "RSG_JAPAN_DEALER_JP."

Further, a resource group ID of a resource group that is a set of resources to be used in the image processing apparatus 100 to be sold by a company store in North America is "RSG_US_DIRECT_EN."

(Content Management Table)

In the storage unit 2000, a content management DB 2003 is further stored, which is provided with a content of a content management table, such as that of illustrated in FIG. 12. By the content management table, a content ID indicating identification information for identifying a content, a content name indicating a name of a content, one or more resource groups belonging to the content, and "a condition indicating an attribute" that is common in the resource group are associated with each other to be managed. The "attribute" of "a condition indicating an attribute" is, for example, any of a type of a language, a type of a culture, and a business model.

Furthermore, when two or more resource groups belong to the same content, succession orders, which are priority orders for displaying among the resource groups, are assigned to the two or more resource groups, respectively, to be managed.

Specifically, a resource group with a high succession order (i.e., a value of the succession order is large) is handled as a resource group with a high priority order for displaying the corresponding resources, and a resource group with a low succession order (i.e., a value of the succession order is small) is handled as a resource group with a low priority order for displaying the corresponding resources.

For example, suppose that, between resource groups belonging to the same content, a resource with a resource name that is the same as a resource name of a resource included in the resource group with a low succession order is also included in the resource group with a high succession order. In this case, for selecting one or more resources, among resources included in the resource group with the low succession order, a resource with a resource name that is the same as a resource name of a resource included in the resource group with the high succession order is selected by replacing (i.e., overwriting) it with the corresponding resource included in the resource group with the high succession order.

Additionally, suppose that, between resource groups belonging to the same content, a resource with a resource name that is different from resource names of resources included in the resource group with the low succession order is included in the resource group with the high succession order. In this case, for selecting one or more resources, the resource with the different resource name included in the resource group with the high succession order is added to be selected.

(Image Table)

In the storage unit 2000, an image DB 2004 is further stored, which is provided with a content of an image table, such as that of illustrated in FIG. 13. By the image table, an image name is associated with binary data to be managed. For example, by the image table illustrated in FIG. 13, the image name "title.jpg" is associated with the binary data "0x4749463836150003100F700000000008 . . . " to be managed.

(User Management Table)

In the storage unit 2000, a user management DB 2005 is further stored, which is provided with a content of a user management table, such as that of illustrated in FIG. 14. By the user management table, a user name, a password, and an affiliated user group are associated with each other to be managed. Namely, by the user management table, users to access the server 200 are managed. For example, by the user management table illustrated in FIG. 14, the user name "UserA," the password "*************," and the affiliated user group "Japan direct shop" are associated with each other to be managed.

(User Group Management Table)

In the storage unit 2000, a user group management DB 2006 is stored, which is provided with a content of a user group management table, such as that of illustrated in FIG. 15. By the user group management table, one or more affiliated user groups are managed. For example, by the user group management table illustrated in FIG. 15, the affiliated user groups "Japan direct shop," "Japanese agent," and "US direct shop" are Managed.

(Rights Management Table)

In the storage unit 2000, a rights management DB 2007 is further stored, which is provided with a content of a rights management table, such as that of illustrated in FIG. 16. By the rights management table, an affiliated user group and a resource group allowed to be referred to are associated with each other to be managed. In FIG. 16, in order to facilitate understanding, the description of the resource group is also described.

According to the example of the rights management table illustrated in FIG. 16, a user belonging to the affiliated user group "Japan direct shop" can refer to the resource groups, "RSG_BASIC_JP," "RSG_BASIC_EN," "RSG_JAPAN_DIRECT_JP," and "RSG_JAPAN_DIRECT_EN." However, the user is not allowed to refer to the resource group, "RSG_US_DIRECT_EN," for example.

<Functional Units of the Server 200>

Next, the units of the server 200 are described.

The transmitter/receiver 252 of the server 200 is implemented by the network I/F 209 illustrated in FIG. 8 and a command from the CPU 201. The transmitter/receiver 252 communicates various types of data (information) with the image processing apparatus 100. The content configurator 254 of the server 200 is implemented by a command from the CPU 201 illustrated in FIG. 8. The content configurator 254 configures the content ID, the content name, the succession orders, the conditions indicating the attributes, and the resource group IDs in the content management table of the content management DB 2003.

The content retrieval unit 256 of the server 200 is implemented by a command from the CPU 201 illustrated in FIG. 8. A content resource request indicating a request for retrieving a resource, which is transmitted from the image processing apparatus 100, is input into the content retrieval unit 256 from the transmitter/receiver 252. Upon detecting that the content resource request is input, the content retrieval unit 256 creates a content table, which is a storage area for storing a resource group ID of a resource group belonging to the corresponding content.

The content retrieval unit 256 identifies and extracts a corresponding content ID from the content management table based on the content ID attached to the content resource request. The content retrieval unit 256 sets, in the content table, resource groups IDs of resource groups belonging to the content represented by the extracted content ID. At that time, the content retrieval unit 256 sets the resource group IDs while maintaining the succession orders that are associated with the resource group IDs when the resource group IDs belong to the content and the association with the conditions indicating the attributes. Then, based on the succession orders for which the association is maintained, the content retrieval unit 256 arranges the resource group IDs in an ascending order.

Further, the content retrieval unit 256 creates a content resource table, which is a storage area for storing a resource name and a resource ID of a resource. Then, the content retrieval unit 256 sequentially extracts the resource group IDs from the content table in the ascending order and deletes the extracted resource group IDs in the content table. The content retrieval unit 256 further determines whether the conditions indicating the attributes for which the association with the resource group IDs extracted from the content table is maintained match the conditions indicating the attributes attached to the content resource request. Upon determining that the conditions indicating the attributes for which the association with the resource groups is maintained match the conditions indicating the attributes attached to the content resource request, the content retrieval unit 256 stores the resource IDs and resource names of the resources included in the resource group in the content resource table.

Note that, when the content retrieval unit 256 stores a resource ID and a resource name of a resource in the content resource table, upon detecting that a resource ID and the resource name of a resource with the same resource name have already been stored, the content retrieval unit 256 overwrites them. In this case, the content retrieval unit 256 changes only the resource ID to the new resource ID.

Then, after executing the same process for all the resource group IDs of the content table, the content retrieval unit 256 transmits, to the image processing apparatus 100 through the transmitter/receiver 252, information indicating the resources associated with the resource IDs included in the content resource table.

The user manager 258 of the server 200 is implemented by a command from the CPU 201, which is illustrated in FIG. 8. The user manager 258 manages users included in the user management table of the user management DB 2005 and affiliated user groups included in the user group management table of the user group management DB 2006. Further, the user manager 258 manages the affiliated user groups and the resource groups allowed to be referred to, which are included in the rights management table of the rights management DB 2007. When a user makes a login request, upon detecting that the combination of the "user name" and the "password" attached to the login request is included in the user management table, the user manager 258 allows the user to log in.

When a user is to be allowed to log in, the user manager 258 identifies a user group to which the user belongs to, by referring the user management table. Upon identifying the user group to which the user belongs, the user manager 258 identifies, by referring to the rights management table, a resource group allowed to be referred to by the identified user group, and allows the user allowed to log in to refer to the resource group. By configuring, for each user group to which a user belongs to, resource group allowed to be referred to, it can be prevented that the resource group is used by an unintended user.

The resource configurator 260 of the server 200 is implemented by a command from the CPU 201, which is illustrated in FIG. 8. The resource configurator 260 configures a resource ID, a resource name, and a resource value in a resource management table of the resource management DB 2001. Further, the resource configurator 260 configures a resource group ID, a description, a resource ID, and a resource name in a resource group management table of the resource group management DB 2002.

The image display unit 264 of the server 200 is implemented by a command from the CPU 201, which is illustrated in FIG. 8, and the display 208. Upon detecting that an image ID transmitted by the image processing apparatus 100 is input from the transmitter/receiver 252, the image-display unit 264 retrieves binary data associated with the image ID from the image table of the image DB 2004. The image display unit 264 transmits, from the transmitter/receiver 252 to the image processing apparatus 100, the binary data retrieved from the image table.

The storage/reading unit 266 of the server 200 is implemented by a command from the CPU 201, which is illustrated in FIG. 8, and the server program stored in the HD 204. The storage/reading unit 266 executes a process of storing various types of data in the storage unit 2000 and a process of reading out various types of data stored in the storage unit 2000.

<Operation of the Image Processing System (Version 1)>

Figure 17:
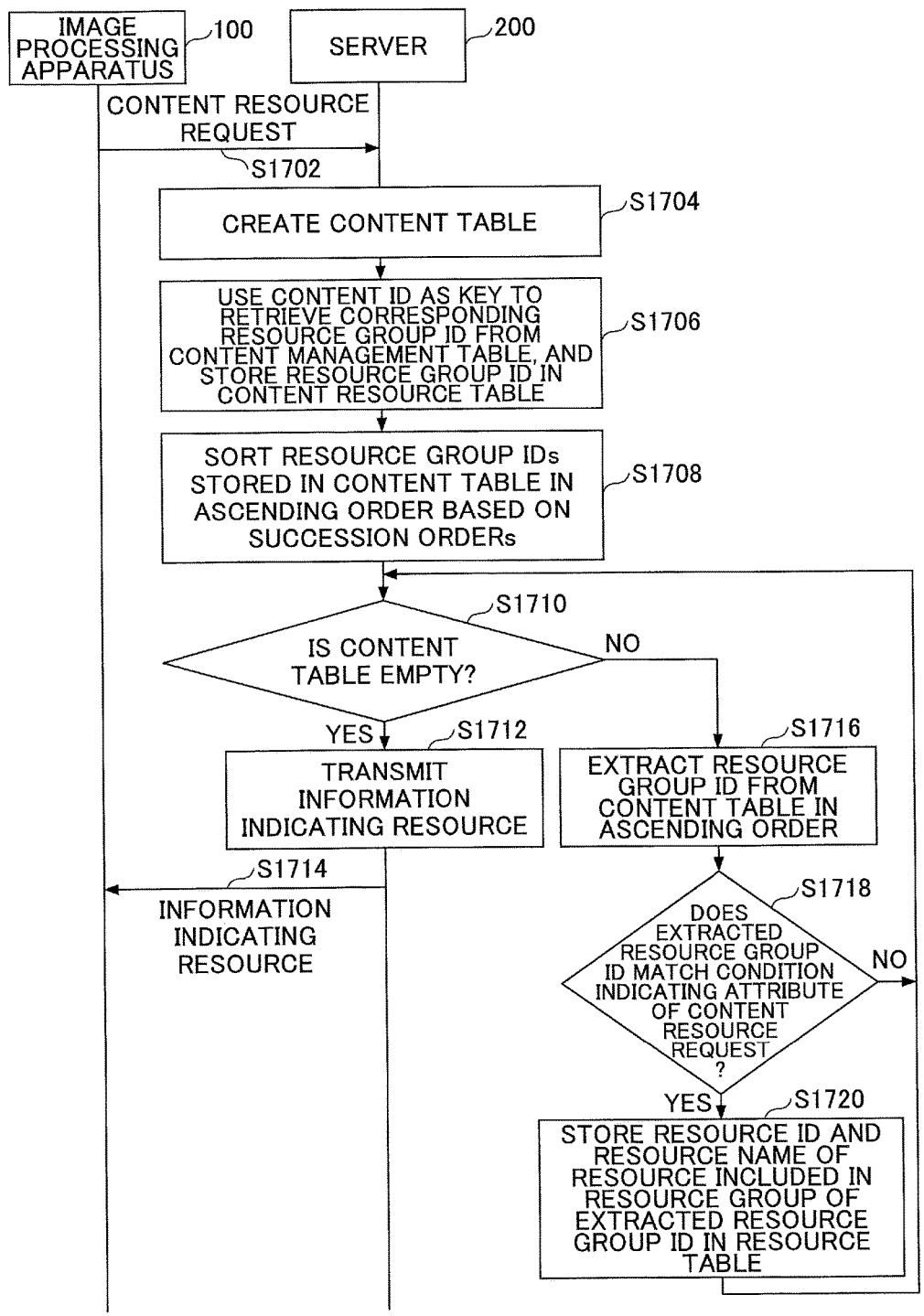
FIG. 17 is a flow chart illustrating an example of an operation of the image processing system according to the first embodiment.

FIG. 17 illustrates an example of an operation of the image processing system according to the first embodiment. FIG. 17 illustrates a process in which the server 200 selects a resource in accordance with a content resource request transmitted by the image processing apparatus 100, and returns information indicating the resource to the image processing apparatus 100.

At step S1702, the transmitter/receiver 152 of the image processing apparatus 100 transmits a content resource request to the server 200. Content IDs and conditions indicating attributes are attached to the content resource request.

For example, when a dealer ships the image processing apparatus 100, a bookmark in which a URL is registered is embedded in the image processing apparatus 100. Then, a condition indicating attribute is attached to a header of the content resource request to be transmitted form the image processing apparatus 100, and a URL is included in a main body. In the URL, a content ID, such as "CONTENTS_JAPAN_DIRECT," is specified as a query, such as "http://applicationmarket.com/index?ContentsId=CONTENTS_JAPAN_DIRECT."

As a result, the server 200 receiving the content resource request can retrieve the condition indicating the attribute from the header; and by retrieving a query from the URL in the main body, the server 200 can determine which type of resources are to be retrieved.

Note that, in this case, by pressing, by a user, a display part of the bookmark displayed on a screen of the image processing apparatus 100, the content resource request is transmitted from the image processing apparatus 100 to the server 200.

Furthermore, the condition indicating the attribute to be attached to the header may also be embedded in the image processing apparatus 100 when the dealer ships the image processing apparatus 100.

At step S1704, the transmitter/receiver 252 of the server 200 receives the content resource request transmitted by the image processing apparatus 100. Upon detecting that the content resource request is received by the transmitter/receiver 252, the content retrieval unit 256 creates a content table and a content resource table.

At step S1706, the content retrieval unit 256 extracts, from the content management table, resource group IDs of resource groups belonging to the corresponding content, by using the content IDs as a key. Then, the content retrieval unit 256 stores the resource group IDs in the content table. At this time, the resource group IDs are stored, while maintaining the succession orders associated with the resource group IDs when the resource group IDs belong to the content indicated by the content management table and the association with the conditions indicating the attributes.

At step S1708, the content retrieval unit 256 sorts the resource group IDs stored in the content table in an ascending order, based on the succession orders for which the association is maintained.

At step S1710, the content retrieval unit 256 determines whether the content table is already empty.

Upon detecting that the content table is already empty (YES at step S1710), the content retrieval unit 256 transmits, from the transmitter/receiver 252 to the image processing apparatus 100, information indicating the resources, which are associated with the resource IDs included in the content resource table at step S1712 and step S1714.

Upon detecting that the content table is not empty yet (NO at step S1710), the content retrieval unit 256 extracts, from the content table at step S1716, the resource group IDs in the ascending order, based on the succession orders for which the association is maintained.

At step S1718, the content retrieval unit 256 determines whether the conditions indicating the attributes for which the association with the resource group IDs extracted from the content table is maintained match the condition indicating the attribute attached to the content resource request. Upon detecting that the conditions indicating the attributes for which the association with the resource group IDs is maintained do not match the condition indicating the attribute attached to the content resource request, the content retrieval unit 256 returns to step S1710. Upon detecting that the conditions indicating the attributes for which the association with the resource group IDs is maintained match the condition indicating the attribute attached to the content resource request, the content retrieval unit 256 proceeds to step S1710.

For example, a case is described in which the condition indicating the attribute attached to the content resource request is "Display language is Japanese." In this case, upon detecting that the conditions indicating the attributes for which the association with the resource group IDs extracted from the content table is maintained are "Display language is Japanese," the content retrieval unit 256 determines that the condition indicating the attribute matches.

However, upon detecting that the conditions indicating the attributes in which the association with the resource group IDs extracted from the content table is maintained are "Display language is English," the content retrieval unit 256 determines that the condition indicating the attribute does not match.

Further, upon detecting that the conditions indicating the attributes in which the association with the resource group IDs extracted from the content table is maintained are "no condition," the content retrieval unit 256 determines that the condition indicating the attribute matches.

At step S1720, the content retrieval unit 256 stores the resource IDs and the resource names that are associated with the resource group IDs (cf. FIG. 11) in the content resource table. After storing the resource IDs and the resource names in the content resource table, the content retrieval unit 256 returns to step S1710.

Note that, when the resource IDs and the resource names are stored in the content resource table at step S1720, due to the relation with the resource IDs and the resource names that have already been stored, the content retrieval unit 256 executes processes in accordance with the succession orders for which the association with the resource group IDs is maintained.

Namely, when the server 200 selects resources by the flow of FIG. 17, as described above, the resource groups with high succession orders are handled as the resource groups with high priority orders for displaying the corresponding resources, compared with the resource groups with low succession orders.

For example, suppose that a resource with resource name that is the same as a resource name of a resource in a resource group with a low succession order is also included in a resource group with a high succession order. In this case, in the content resource table, among the resources included in the resource group with the low succession order, a resource with a resource name that is the same as a resource name of a resource included in the resource group with the high succession order is selected by replacing (i.e., overwriting) it with the corresponding resource included in the resource group with the high succession order.

Further, suppose that a resource with a resource name that is different from resource names of resources in a resource group with a low succession order is included in a resource group with a high succession order. In this case, the resource with the different resource name in the resource group with the high succession order is added to the content resource table to be selected.

FIG. 18A and FIG. 18B illustrate examples of the process in which the server 200 selects resources by the flow illustrated in FIG. 17. More specifically, FIG. 18A and FIG. 18B illustrate examples of the content resource tables at the time of the first loop and the second loop in the flow of FIG. 17, respectively. As described above, the resource IDs and the resource names are stored in the content resource table.

In order to facilitate understanding of the content resource tables, in FIG. 18A and FIG. 18B, the values of the resources are also indicated.

Here, a case is described in which "CONTENTS_US_DIRECT" is specified as a content ID in the content resource request transmitted by the image processing apparatus 100 at step S1702 of FIG. 17 and "Display language is English" is attached as the condition indicating the attribute.

At step S1704, a content table is created. Then, at step S1706, resource group IDs belonging to a content corresponding to the content ID "CONTENTS_US_DIRECT" are retrieved from the content management table of FIG. 12. Then, the resource group IDs are stored in the content table. At that time, the resource group IDs are stored while maintaining the succession orders associated with the resource group IDs when the resource group IDs are associated with the content ID indicated in the content management table and the association with the conditions indicating the attributes.

Specifically, in the content management table illustrated in FIG. 12, the resource group IDs that are associated with the content ID "CONTENTS_US_DIRECT" are two in total, which are "RSG_BASIC_EN" and "RSG_US_DIRECT_EN." Then, when the two resource group IDs illustrated in the content management table are associated with the content ID "CONTENTS_US_DIRECT," the succession order "1st" and the condition indicating the attribute "no condition" are associated with one of the two resource group IDs, and the succession order "2nd" and the condition indicating the attribute "no condition" are associated with the other one of the two resource group IDs. Accordingly, in this case, the resource group ID "RSG_BASIC_EN" is stored in the content table while maintaining the association with the succession order "1st" and the condition indicating the attribute "no condition," and the resource group ID "RSG_US_DIRECT_EN" is stored in the content table while maintaining the association with the succession order "2nd" and the condition indicating the attribute "no condition."

Next, at step S1708, in the content table, the stored resource group IDs are sorted in an ascending order, based on the succession orders for which the association is maintained.

Here, as the result of the determination is still NO at step S1710, at step S1716 for the first loop, the resource group IDs are extracted in an ascending order from the content table, while maintaining the association.

In this example, at step S1716, from the content table, the resource group ID "RSG_BASIC_EN" with the succession order "1st," for which the association is maintained, is extracted.

Next, at step S1718, a determination is made as to whether the condition indicating the attribute for which the association with the resource group ID "RSG_BASIC_EN" is maintained matches the condition indicating the attribute that is attached to the content resource request.

The condition indicating the attribute that is attached to the content resource request is "Display language is English." Further, the condition indicating the attribute for which the association with the resource group ID "RSG_BASIC_EN" is maintained is "no condition" (cf. FIG. 12). Accordingly, a determination is made that the condition indicating the attribute for which the association with the resource group ID "RSG_BASIC_EN" is maintained matches the condition indicating the attribute that is attached to the content resource request (YES at step S1718).

Then, at step S1720, the resource IDs and the resource names that are associated with the resource group ID "RSG_BASIC_EN" are retrieved from the resource group management table (cf. FIG. 11).

Then, as illustrated in FIG. 18A, the resource IDs and the resource names that are associated with the resource group ID "RSG_BASIC_EN" are stored in the content resource table, and the process returns to step S1710.

Here, the determination result at step S1710 is still NO. Accordingly, at step S1716 in the subsequent second loop, the resource group ID "RSG_US_DIRECT_EN" of the resource group with the succession order "2nd," for which the association is maintained, is extracted from the content table, while maintaining the association.

Then, at step S1718, a determination is made as to whether the condition indicating the attribute for which the association with the resource group ID "RSG_US_DIRECT_EN" is maintained matches the condition indicating the attribute that is attached to the content resource request.

The condition indicating the attribute that is attached to the content resource request is "Display language is English," and the condition indicating the attribute for which the association with the resource group ID "RSG_US_DIRECT_EN" is maintained is "no condition" (cf. FIG. 12). Accordingly, a determination is made that the condition indicating the attribute for which the association with the resource group ID "RSG_US_DIRECT_EN" is maintained matches the condition indicating the attribute that is attached to the content resource request (YES at step S1718).

Next, at step S1720, the resource IDs and the resource names that are associated with the resource group ID "RSG_US_DIRECT_EN" are retrieved from the resource group management table (FIG. 11). Then, the resource IDs and the resource names that are associated with the resource group ID "RSG_US_DIRECT_EN" are stored in the content resource table.

Here, in the above-described first loop, as illustrated in FIG. 18A, the resource names that are the same as the resource names associated with the resource group ID "RSG_US_DIRECT_EN" (cf. FIG. 11) have already been stored in the content resource table. Namely, among the resource IDs (cf. FIG. 11) associated with the resource group ID "RSG_BASIC_EN" illustrated in FIG. 18A, the resource names of the resource IDs "14," "15," "17," and "20" respectively match the resource names of the resource IDs "14," "15," "18," and "21" that are associated with the resource group ID "RSG_US_DIRECT_EN." Accordingly, in this case, the content retrieval unit 256 of the server 200 replaces (overwrites) the resource IDs and the resource names that have already been stored with the new resource IDs and the new resource names that are associated with the resource group ID "RSG_US_DIRECT_EN," respectively, and selects them.

As a result, as illustrated in FIG. 18B, in the content resource table in the second loop, among the resource IDs associated with the resource group ID "RSG_BASIC_EN" in FIG. 18A, the resource IDs "14," "15," "17," and "20" are respectively replaced with the new resource IDs "14," "15," "18," and "21" that are associated with the resource group ID "RSG_US_DIRECT_EN."

At step S1716 in the above-described two loops, the resource group IDs "RSG_BASIC_EN" and "RSG_US_DIRECT_EN" that are stored in the content table are already extracted. Accordingly, the content table is already empty. Consequently, information indicating the resources associated with the resource IDs stored in the content table illustrated in FIG. 18B is transmitted to the image processing apparatus 100 (steps S1712 and S1714).

As described above, when the resources that are elements of a screen are managed in a parent-child relation, it is not necessary to redundantly define, as child elements, the localization items that are defined as parent elements. As a result, data (resource) for localization can be reduced.

It is described by exemplifying the relation between the resource group of the resource group ID "RSG_BASIC_EN" and the resource group of the resource group ID "RSG_US_DIRECT_EN." In this case, the resource group of the resource group ID "RSG_BASIC_EN" is the "parent," and the resource group of the resource group ID "RSG_US_DIRECT_EN" is the "child."

Accordingly, as described above, in this case, it is not necessary to redundantly define the resources with the resource IDs "1", "3," "5," "8," "9," "11," "13," and "7" that are defined as the elements of the resource group of the resource group ID "RSG_BASIC_EN", which is the parent, as the resources of the resource group of resource group ID "RSG_US_DIRECT_EN," which is the child (cf. FIG. 11).

<Operation of the Image Processing System (Version 2)>

FIG. 19 illustrates a process of the image processing apparatus 100 for retrieving information indicating resources from the server 200. At step S1902, a user operates the operations panel 27 of the image processing apparatus 100 to request display of a screen of the application market.

At step S1904, the retrieval unit 154 of the image processing apparatus 100 creates a content resource request that indicates information to request for information indicating resources to be displayed on the screen, and transmits the content resource request from the transmitter/receiver 152 to the server 200. A content ID and a condition indicating an attribute, such as a display language, are attached to the content resource request.

At step S1906, upon receiving the content resource request transmitted by the image processing apparatus 100, the transmitter/receiver 252 of the server 200 inputs the content resource request to the content retrieval unit 256. The content retrieval unit 256 creates a content resource table based on the content ID and the condition indicating the attribute that are attached to the content resource request input by the transmitter/receiver 252. As the process of creating the content resource table, the method described above by referring to FIG. 17 can be applied.

At step S1908, the content retrieval unit 256 of the server 200 converts the information indicating the resources associated with the resource ID included in the content resource table, which is created at step S1906, into a format used for data transfer between the server 200 and the image processing apparatus 100, such as a json (JavaScript (registered trademark) Object Notation) format.

At step S1910, the transmitter/receiver 252 of the server 200 transmits, to the image processing apparatus 100, the information indicating the resources that is converted into the json format by the content retrieval unit 256.

At step S1912, the transmitter/receiver 152 of the image forming apparatus 100 stores, in a local storage, such as the storage unit 162, the information indicating the resources converted into the json format, which is received from the server 200.

At step S1914, the retrieval unit 154 of the image processing apparatus 100 localizes the software, such as a browser, by executing initialization for i18n (internationalization) using the information indicating the resources converted into the json format.

At step S1916, the display controller 158 of the image processing apparatus 100 creates a screen of the application market using the information indicating the resources converted into the json format, and displays the screen on the operations panel 27. Note that, at that time, the display controller 158 can retrieve information required for displaying the resources from the server 200, depending on necessity.

FIG. 20 illustrates an example of a content of an HTML (HyperText Markup Language) file, as an example of the information indicating the resources, which is returned, at step S1910, from the server 200 to the web browser installed on the image processing apparatus.

At step S1918, a user can view the screen of the application market (i.e., the screen of the application list), which is displayed on the operations panel 27 of the image processing apparatus 100.

In the above-described image processing system according to the first embodiment, the number of the servers 200 is not limited to one and may be greater than one; and any server of the plurality of servers may be provided with any function of the functions of the server 200. Then, by executing the functions of the server 200 by the plurality of servers, the above-described cloud service by the server 200 may be provided.

In the image processing system according to the first embodiment, as described above, the resources, which are the elements of the screen, are managed in the parent-child relation. As a result, the localization items defined in terms of a language, culture, a location, and a business model of the parent may not be redundantly defined in terms of a language, culture, a location, and a business model of the child. Consequently, a load on the work of the localization can be reduced. Namely, with the image processing system according to the first embodiment, the parent and the child of the resource groups may not have redundant resources.

Further, a resource to be displayed on the screen may be a URL in which a style sheet (CSS (Cascading Style Sheet)) is registered. As a result, by changing the style sheet, a dealer can change a position, a color, a size, etc., of a display component on the screen of the application market. Furthermore, a URL in which an image is registered may be a resource. As a result, a dealer can freely change an image to be used for the screen of the application market.

When a content resource request is to be transmitted to the server 200, the image processing apparatus 100 may attach information indicating a display language, as a condition indicating an attribute. As a result, a display content of the screen of the application market may be switched in accordance with to the display language of the web browser installed on the image processing apparatus 100.

When a content resource request is to be transmitted to the server 200, the image processing apparatus 100 may attach information about an accessing terminal (e.g., a PC or a tablet terminal), as a condition indicating an attribute. As a result, a display content of the screen of the application market can be switched, depending on a terminal accessing the image processing apparatus 100.

Second Embodiment

<Image Processing System>

Figure 21:
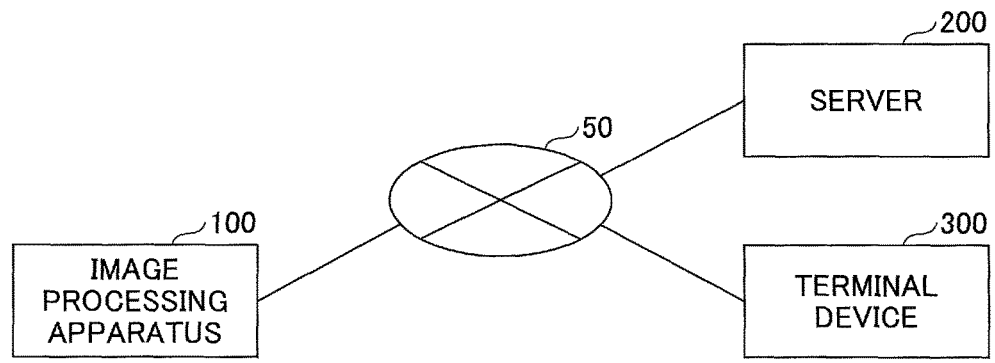
FIG. 21 is a diagram illustrating an example of a configuration of an image processing system according to a second embodiment.

FIG. 21 illustrates an image processing system according to a second embodiment. As illustrated in FIG. 21, the image processing system is obtained by adding a terminal device 300 to the image processing system according to the first embodiment, which is described by referring to FIG. 1. The terminal device 300 is mainly used at a dealer.

<Hardware Configuration of the Terminal Device 300>

The terminal device 300 is provided with a hardware configuration that is the same as that of the server 200 described by referring to FIG. 8, and, thus, a duplicate description is omitted. However, in the HD 204 of the terminal device 300, a terminal device program is recorded, which is for controlling the terminal device 300.

In this case, the terminal device program may also be recorded in a computer readable recording medium, such as the recording medium 206 or the CD-ROM 213, as a file in an installable format or a executable format, so as to be distributed. Further, the terminal device program may be stored in the ROM 202, instead of the HD 204. Note that, as another example of the removable recording medium, such as the CD-ROM 213, there is a computer readable recording medium, such as a CD-R, a DVD, and a Blu-ray disc. The terminal device program may be recorded in such a recording medium, so as to be provided.

<Functional Configuration of the Terminal Device 300 According to the Second Embodiment>

Figure 22:
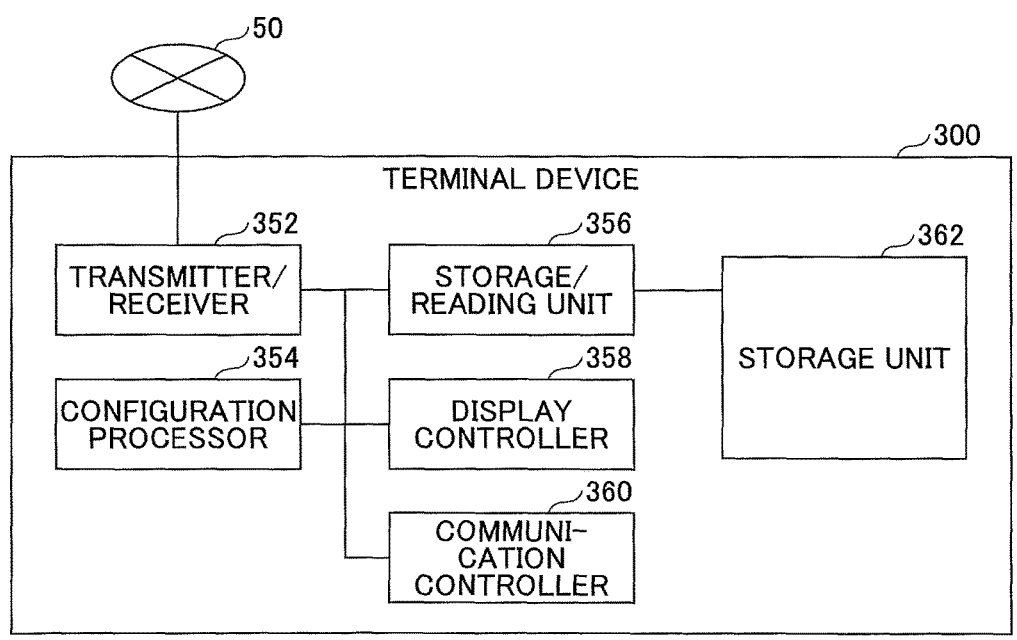
FIG. 22 is a functional block diagram of an example of a terminal device according to the second embodiment.

Next, a functional configuration of the terminal device 300 according to the second embodiment is described. FIG. 22 is a functional block diagram of an example of the terminal device 300. The terminal device 300 is provided with a transmitter/receiver 352; a configuration processor 354; a storage/reading unit 356; a display controller 358; and a communication controller 360. Each of these components is implemented by an operation of a component illustrated in FIG. 8 by a command from the CPU 201 in accordance with the terminal device program, which is stored in the HD 204. Furthermore, the terminal device 300 is provided with a storage unit 362, which is implemented by the HD 204 illustrated in FIG. 8.

<Functional Units of the Terminal Device 300>

Next, each component of the terminal device. 300 is described in detail. The transmitter/receiver 352 of the terminal device 300 is implemented by the network I/F 209 illustrated in FIG. 8 and a command from the CPU 201. The transmitter/receiver 352 communicates various types of data (information) with the server 200.

The configuration processor 354 of the terminal device 300 is implemented by a command from the CPU 201 illustrated in FIG. 8 and the terminal device program stored in the HD 204; and the configuration controller 354 accesses the server 200 to configure various types of information stored in the server 300.

The display controller 358 of the terminal device 300 is implemented by the display 208 illustrated in FIG. 8 and a command from the CPU 201. The display controller 358 controls to display a configuration screen, which is retrieved by accessing the server 200 by the configuration processor 354.

The communication controller 360 of the terminal device 300 is implemented by a command from the CPU 201 illustrated in FIG. 8 and the network I/F 209. The communication controller 360 controls communication between the terminal device 300 and the server 200.

The storage/reading unit 356 of the terminal device 300 is implemented by a command from the CPU 201 illustrated in FIG. 8 and the terminal device program stored in the HD 204. The storage/reading unit 356 executes a process of storing various types of data in the storage unit 362 and a process of reading out various types of data stored in the storage unit 362.

The storage unit 362 of the terminal device is implemented by the ROM 202 illustrated in FIG. 8 and the HD 204. The storage unit 362 stores a web browser and the terminal device program.

<Operation of the Image Processing System>

By the terminal device 300 provided with the above-described configuration, a screen of an application market is configured.

Figure 23:
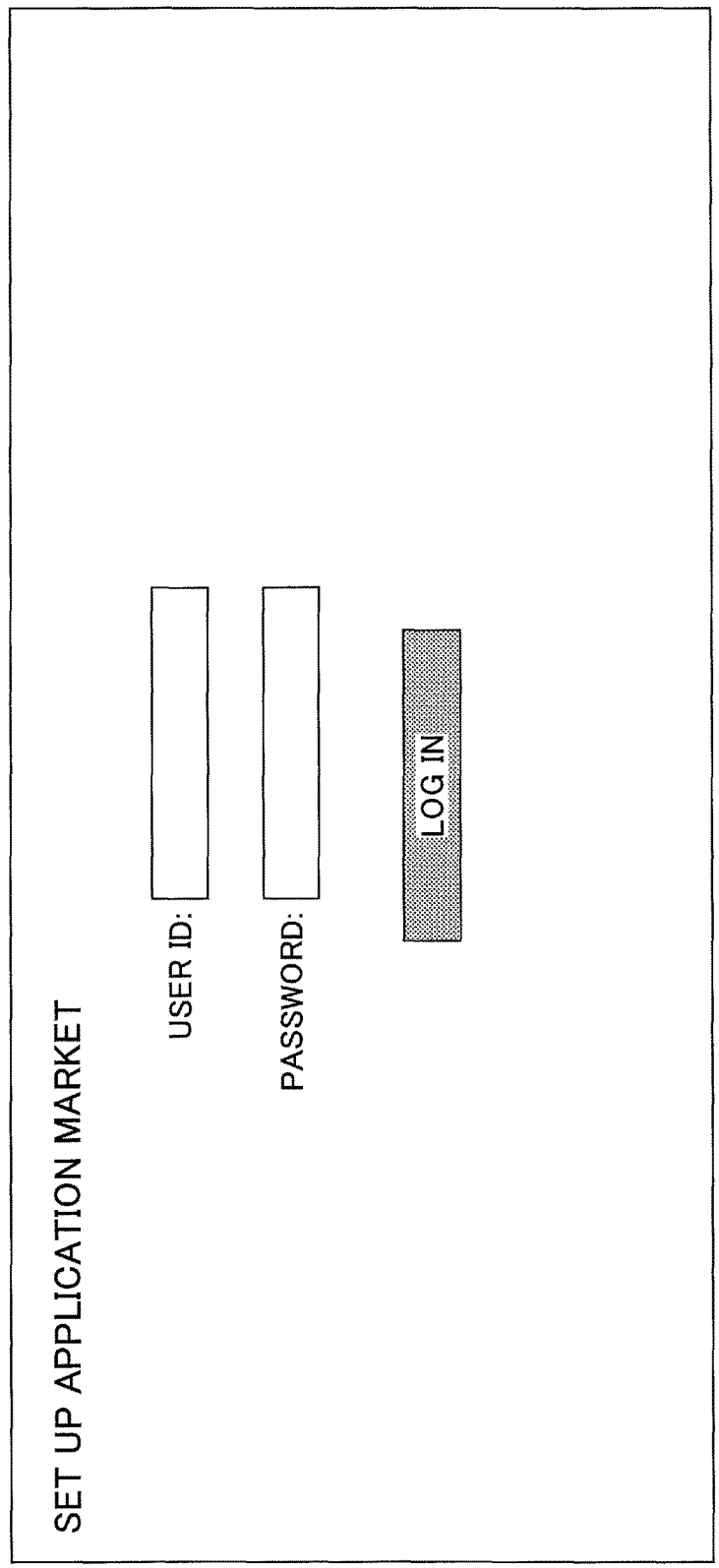
FIG. 23 is a diagram illustrating an example of a log-in screen.

FIG. 23 illustrates an example of a login screen of the terminal device 300, which is used in a dealer.

A user accesses the server 200 by operating the terminal device 300, and causes the terminal device 300 to display a login screen. When the user inputs "user ID" and "password" on the login screen and presses the "login" button (i.e., performs a click operation, etc., using the mouse 212 on the button), "user ID" and "password" are transmitted to the server 200. The user manager 258 of the server 200 refers to the user management table in the user management DB 2005. Then, the user manager 258 determines whether the user management table includes a combination of "user ID" and "password" that matches the combination of "user ID" and "password" transmitted from the terminal device 300. Upon detecting that the combination is included in the user management table, the user manager 258 allows the user to log in. After logging in, the configuration screen of the screen of the application market is displayed on the terminal device 300.

<Set Up of the Resource Management Table>

FIG. 24 illustrates an example of a configuration screen of the resource management table.

On the configuration screen of the resource management table, a list of resources that have already been configured is displayed. In the list of the resources, for each resource, "resource ID," "resource name," and "resource value" are associated and displayed. Further, for each resource, the words "update" and "delete" are associated and displayed.

When a user presses a display part of the words "update" (namely, performs a click operation, etc., using the mouse 212 on the display part), a screen for inputting "resource ID," "resource name," and "resource value" for the updated resource is displayed. The user can update the resource by inputting "resource ID," "resource name," and "resource value" for the updated resource. When a user presses a display part of the words "delete" (namely, performs a click operation, etc., using the mouse 212 on the display part), the resource associated with the "delete" can be deleted.

Figure 25:
FIG. 25 is a diagram illustrating an example of a screen for adding a resource.

FIG. 25 illustrates an example of the screen displayed on the terminal device 300 when the display part of the words "addition of a resource" is pressed on the screen of FIG. 24 (namely, a click operation, etc., using the mouse 212 is performed on the display part).

By pressing the display part of the words "addition of a resource" on the screen of FIG. 25 (namely, by performing a click operation, etc., using the mouse 212 on the display part), the user can add a resource. When the display part of the words "addition of a resource" is pressed (i.e., a click operation, etc., using the mouse 212 is performed on the display part), a screen for inputting items of "resource ID," "resource name," and "resource value" is displayed. By operating the keyboard 211, the user can input "resource ID," "resource name," and "resource value." After inputting the items, when the user presses the display part of the word "add" (namely, a click operation, etc., using the mouse 212 is performed on the display part), a corresponding resource is added to the list of the resources.

<Set Up of the Resource Group Management Table>

FIG. 26 illustrates an example of a configuration screen of the resource group management table. On the configuration screen of the resource group management table, a list of the resource groups that have already been configured is displayed.

In the list of the resource groups, for each resource group, the words "resource group ID" and "description" are associated and displayed. Furthermore, for each resource group, the words "edit" and "delete" are associated and displayed.

FIG. 27 illustrates an example of a screen, which is displayed when the display part of the word "edit" on the configuration screen of the resource group management table illustrated in FIG. 26 is pressed (i.e., a click operation, etc., using the mouse 212 is performed on the display part). When a user presses the display part of the word "edit" on the screen of FIG. 27, the display screen is shifted from the configuration screen of the resource group management table to a screen for editing a resource group associated with the word "edit," which is pressed.

On the screen for editing the resource group, a column is provided that is for inputting a resource ID of a resource to be added to the resource group. When the user inputs the resource ID into the column and presses the display part of the words "addition of a resource" or "set up a right" is pressed (i.e., a click operation, etc., using the mouse 212 is performed on the display part), the resource is added to the resource group.

FIG. 28 illustrates an example of a screen displayed, when the display part of the words "set up a right" on the screen for editing the resource group illustrated in FIG. 27 is pressed (namely, a click operation, etc., using the mouse 212 is performed on the display part). On the screen, one or more user group names and check boxes, which are to be checked to indicate whether to permit, are associated and displayed.

On the screen of FIG. 28, the user can check the check box associated with the user group name that is allowed to access the resource group, and the user can press the display part of the word "set up" (namely, perform a click operation, etc., using the mouse 212 on the display part). As a result, an access right is added to the user group represented by the user group name. Further, by pressing the display part of the words "set up," the display screen is shifted to the screen illustrated in FIG. 27.

The user can press the display part of the words "addition of a resource" on the screen of FIG. 27 (namely, perform a click operation, etc., using the mouse 212 on the display part), which is displayed after the access right is added to the user group by the above-described operation. As a result, the resource is added to the resource group, and the right for accessing the resource group is added to the user group.

<Set Up of the Content Management Table>

FIG. 29 illustrates an example of a configuration screen of the content management table. In the configuration screen of the content management table, a list of the content items that have already been configured is displayed. In the list of the content items, for each content item, "content ID" and "content name" are associated and displayed. Further, for each content item, the words "edit" and "delete" are associated and displayed.

FIG. 30 illustrates an example of a screen, which is displayed when the display part of the word "edit" is pressed on the configuration screen of the content management table illustrated in FIG. 29 (namely, a click operation, etc., using the mouse 212 is performed on the display part). When the display part of the word "edit" is pressed by a user on the screen of FIG. 29, the display screen is shifted to the screen for editing the content associated with the word "edit," which is pressed.

The screen for editing the content illustrated in FIG. 30 is provided with a field for inputting a resource group ID of the resource group to be added to the content and a field for inputting a condition indicating an attribute. The user can input a resource group ID into the field for inputting the resource group ID, input a condition indicating an attribute into the field for inputting the condition indicating the attribute, and press the display part of the words "addition of a resource group" (namely, perform a click operation, etc., using the mouse 212 on the display part). As a result, the resource group is added to the content.

With the image processing system according to the second embodiment, by providing the terminal device 300 for executing various configurations on the server 200, various configurations can be made on the resources, the resource groups, the contents, etc.

In the above-described embodiments, the server is an example of each of the information processing apparatus and the computer, and the image processing apparatus is an example of the client device. The resource management DB, the resource group management DB, and the content management DB are an example of a resource manager and a memory, and transmitter/receiver is an example of a transmitter and a receiver. Further, the content retrieval unit is an example of the selector, the succession orders are an example of the priority orders, the server program is an example of the information processing program, and the image processing system is an example of the information processing system.

The present invention is described by referring to the embodiments and modifications; however, the embodiments and the modifications are merely examples, and a person ordinarily skilled in the art will appreciate various variations, modifications, alternatives, substitutions, etc. For convenience of the description, the apparatuses according to the embodiments of the present invention are described using the functional block diagrams; however, such apparatuses may be implemented by hardware, software, or a combination thereof. The present invention is not limited to the above-described embodiments, and various variations, modifications, alternatives, substitutions, etc., can be implemented within the scope of the present invention, without departing from the sprit of the present invention.

The invention claimed is:

1. An information processing apparatus for providing, via a network, information indicating a resource to be displayed on a screen of a client device, the information processing apparatus comprising:
   a resource manager configured to store a plurality of resources, wherein each of the plurality of resources belongs to one of a plurality of resource groups, each of the plurality of resource groups belongs to a content item, display priority orders are respectively assigned to two or more of the resource groups when the two or more of the resource groups belong to the content item, and identification information is attached to the content item;
   a receiver configured to receive, from the client device, the identification information of the content item;
   a selector configured to select, based on the identification information of the content item and the priority orders for displaying, a resource to be displayed on the screen of the client device from the plurality of resources; and
   a transmitter configured to transmit information indicating the resource to the client device.

2. The information processing apparatus according to claim 1, wherein the resource manager is configured to store an attribute while associating the attribute with a resource group,
   wherein the receiver is configured to receive the attribute from the client device, and
   wherein the selector is configured to select the resource based on the identification information of the content item, the priority orders for displaying, and the attribute.

3. The information processing apparatus according to claim 1, wherein, upon detecting that resources with same names are respectively included in at least two of the two or more of the resource groups, the selector is configured to select the resource with the high priority order for displaying.

4. The information processing apparatus according to claim 1, wherein the resource is a word or a URL.

5. The information processing apparatus according to claim 2, wherein the attribute is one of a type of a language, a culture type, and a business model.

6. An information processing method for providing, via a network, information indicating a resource to be displayed on a screen of a client device,
   wherein a plurality of resources is stored in a memory, each of the plurality of resources belongs to one of a plurality of resource groups, each of the plurality of resource groups belongs to a content item, display priority orders are respectively assigned to two or more of the resource groups when the two or more of the resource groups belong to the content item, and identification information is attached to the content item,
   the information processing method comprising:
   a step of receiving, from the client device, the identification information of the content item;
   a step of selecting, based on the identification information of the content item and the priority orders for displaying, a resource to be displayed on the screen of the client device from the plurality of resources stored in the memory; and
   a step of transmitting information indicating the resource to the client device.

7. An information processing system for providing, via a network, information indicating a resource to a client device, the information processing system including one or more information processing apparatuses, the information processing system comprising:
   a resource manager configured to store a plurality of resources, wherein each of the plurality of resources belongs to one of a plurality of resource groups, each of the plurality of resource groups belongs to a content item, display priority orders are respectively assigned to two or more of the resource groups when the two or more of the resource groups belong to the content item, and identification information is attached to the content item;
   a receiver configured to receive, from the client device, the identification information of the content item;
   a selector configured to select, based on the identification information of the content item and the priority orders for displaying, a resource to be displayed on a screen of the client device from the plurality of resources; and
   a transmitter configured to transmit information indicating the resource to the client device.

* * * * *